US009083888B2

(12) United States Patent
Min et al.

(10) Patent No.: US 9,083,888 B2
(45) Date of Patent: Jul. 14, 2015

(54) SHUTTER DRIVING SYSTEM AND CAMERA DEVICE HAVING THE SAME, AND DRIVING METHOD THEREOF

(71) Applicant: Samsung Electronics Co. Ltd., Suwon-si, Gyeonggi-do (KR)

(72) Inventors: Sangki Min, Hwaseong-si (KR); Yongwook Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/891,706

(22) Filed: May 10, 2013

(65) Prior Publication Data
US 2014/0016023 A1    Jan. 16, 2014

(30) Foreign Application Priority Data

Jul. 13, 2012   (KR) ........................ 10-2012-0076433

(51) Int. Cl.
*G03B 9/32*       (2006.01)
*H04N 5/238*      (2006.01)
*H04N 5/235*      (2006.01)
*G03B 9/08*       (2006.01)
*G03B 9/42*       (2006.01)

(52) U.S. Cl.
CPC ................ *H04N 5/2353* (2013.01); *G03B 9/08* (2013.01); *G03B 9/42* (2013.01)

(58) Field of Classification Search
CPC ............ G03B 9/34; G03B 9/32; G03B 17/42; G03B 19/12; G03B 7/083; G03B 9/10; G03B 9/12; H04N 5/2254; H04N 5/2353; H04N 5/238
USPC ........................... 348/368; 396/480–489, 471
See application file for complete search history.

(56) References Cited

U.S. PATENT DOCUMENTS

| 2002/0064388 | A1* | 5/2002 | Takahashi ..................... 396/484 |
| 2005/0063698 | A1* | 3/2005 | Usuda et al. .................. 396/489 |
| 2010/0026881 | A1 | 2/2010 | Kim |
| 2011/0164871 | A1* | 7/2011 | Shintani ........................ 396/484 |
| 2011/0176799 | A1* | 7/2011 | Shintani ........................ 396/484 |

* cited by examiner

Primary Examiner — Tuan Ho
Assistant Examiner — Selam Gebriel
(74) Attorney, Agent, or Firm — Jefferson IP Law, LLP

(57) ABSTRACT

A shutter driving system and a camera device having the same, and a driving method thereof are provided. The shutter driving system includes a base plate including an opening part, a front-curtain and a rear-curtain, a front-curtain link and a rear-curtain link supporting respective folding and unfolding operations of the front-curtain and the rear-curtain, a front-curtain drive lever and a rear-curtain drive lever controlling respective drives of the front-curtain link and the rear-curtain link for opening and closing the opening part, a front-curtain electromagnet and a rear-curtain electromagnet selectively and respectively stopping the front-curtain and rear-curtain drive levers, a cam gear mechanically closing the opening part of the front curtain and mechanically opening the opening part of the rear-curtain, a motor rotating the cam gear, and a reduction gear train including at least one gear disposed between the cam gear and the motor.

20 Claims, 12 Drawing Sheets

SHUTTER DRIVING SYSTEM AND CAMERA DEVICE HAVING THE SAME, AND DRIVING METHOD THEREOF

PRIORITY

This application claims the benefit under 35 U.S.C. §119(a) of a Korean patent application filed on Jul. 13, 2012 in the Korean Intellectual Property Office and assigned Serial No. 10-2012-0076433, the entire disclosure of which is hereby incorporated by reference.

BACKGROUND OF THE INVENTION

1. Field of the Invention

The present invention relates to a shutter driving system for a camera. More particularly, the present invention relates to a shutter driving system for a digital camera, a camera device having the same, and a driving method thereof, which minimize a time lag and enable a compact design in structure by controlling shutter exposure time according to a predefined unit.

2. Description of the Related Art

Digital cameras of the related-art may have a Focal Plane Shutter (FPS) that includes an opening part of the shutter that should remain open so that an image of a subject can be shown through an Electronic View Finder (EVF) or a Liquid Crystal Display (LCD) installed at a backside of the camera. In such related-art digital cameras, a driving method of the camera may include providing components including a front-curtain and a rear-curtain in order to control opening and closing of the opening part, stopping a setting operation when in an open state of the opening part by driving only the rear-curtain after performing an exposure, and operating camera shutter devices to return to an exposure start position and moving a set member to an exposure completion position by operating the front-curtain to close the opening part as soon as the exposure is performed after operating the camera shutter devices for photographing. In such a driving method, the opening part for the exposure must go through an open state in a continuous photographing process, and after performing the exposure, a process of transferring data accumulated in an imaging device to a storage unit must be completed before the front-curtain and the rear-curtain move to the exposure start position.

Furthermore, a method of using a permanent magnet as a member for supporting and stopping a front-curtain and a rear-curtain has been suggested in the related-art. In the method using the permanent magnet, the rear-curtain stops at an exposure start position by using the permanent magnet after performing an exposure, and an opening part of a shutter remains in an open state while returning the front-curtain to an exposure completion position. When capturing a photograph, the opening part of the shutter is closed while moving the front-curtain to the exposure start position, and camera shutter devices move to the exposure completion position as soon as the exposure is performed. However, in this method, the rear-curtain is held for a long time by the permanent magnet, and thereby has a disadvantage that a deviation in timing of releasing the rear-curtain may be generated due to the operational characteristic of magnetic power of the permanent magnet. For that reason, operations of releasing the rear-curtain once before moving the front-curtain to the exposure start position and moving, again, the front-curtain and the rear-curtain to the exposure start position are needed. Accordingly, in the related-art capturing of a photograph, there is a problem that a long time lag is generated between the start of photographing by pressing a shutter release button and the start of an actual exposure in the related-art photographing.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a shutter driving system enabling a quick and precise shutter operation in a photographing event by using a mechanical system for maintaining an opening part of the shutter driving system in an open state and maximizing a space efficiency by minimizing a number of components for supporting a shutter operation, a camera device having the same, and a camera driving method.

In accordance with an aspect of the present invention, a shutter driving system is provided. The system includes a base plate including an opening part, a front-curtain and a rear-curtain, both the front-curtain and the rear-curtain being disposed at an edge of the base plate, a front-curtain link and a rear-curtain link supporting respective folding and unfolding operations of the front-curtain and the rear-curtain, a front-curtain drive lever and a rear-curtain drive lever controlling respective drives of the front-curtain link and the rear-curtain link for opening and closing the opening part by the front-curtain and the rear-curtain, a front-curtain electromagnet and a rear-curtain electromagnet selectively and respectively stopping the front-curtain drive lever and the rear-curtain drive lever, a cam gear mechanically closing the opening part of the front-curtain by operating the front-curtain drive lever and mechanically opening the opening part of the rear-curtain by operating the rear-curtain drive lever, a motor rotating the cam gear, and a reduction gear train including at least one gear disposed between the cam gear and the motor for reducing a rotation speed of the motor to a reduced rotation speed of the cam gear.

In accordance with another aspect of the present invention, a camera device is provided. The camera device includes a shutter driving system for controlling a shutter operation, a sensor array capturing an image according to the operation of the shutter driving system, and an image processor controlling the shutter driving system and capturing an image projected onto the sensor array.

In accordance with another aspect of the present invention, a camera driving method is provided. The method includes preparing a camera having a shutter driving system provided with a base plate including an opening part, a front-curtain and a rear-curtain, both the front-curtain and the rear-curtain being disposed at an edge of the base plate, a front-curtain drive lever and a rear-curtain drive lever controlling opening and closing operations of the opening part respectively of the front-curtain and the rear-curtain, a front-curtain electromagnet and a rear-curtain electromagnet selectively and respectively stopping the front-curtain drive lever and the rear-curtain drive lever, a cam gear mechanically closing the opening part of the front-curtain by operating the front-curtain drive lever and mechanically opening the opening part of the rear-curtain by operating the rear-curtain drive lever, and a motor for rotating the cam gear, controlling the rear-curtain to mechanically open the opening part by operating the rear-curtain drive lever based on a rear-curtain gear line of the cam gear, and controlling the front-curtain to maintain an open state of the opening part without operating the front-curtain drive lever.

In accordance with another aspect of the present invention, a camera driving method is provided. The method includes preparing a camera having a shutter driving system provided with a base plate including an opening part, a curtain disposed at an edge of the base plate, a drive lever controlling opening and closing of the opening part of the curtain, an electromagnet selectively stopping the drive lever, a cam gear mechanically closing the opening part of the curtain by operating the drive lever, and a motor rotating the cam gear, and controlling the curtain to mechanically open the opening part by operating the drive lever based on a gear line formed in the cam gear.

As described above, according to the present invention, the shutter driving system, a camera device having the same, and a camera driving method thereof provide a unique shutter timing having an excellent speed.

Further, the present invention maximizes space efficiency by optimizing the configuration of the shutter system, and thereby provides flexibility in a terminal design.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
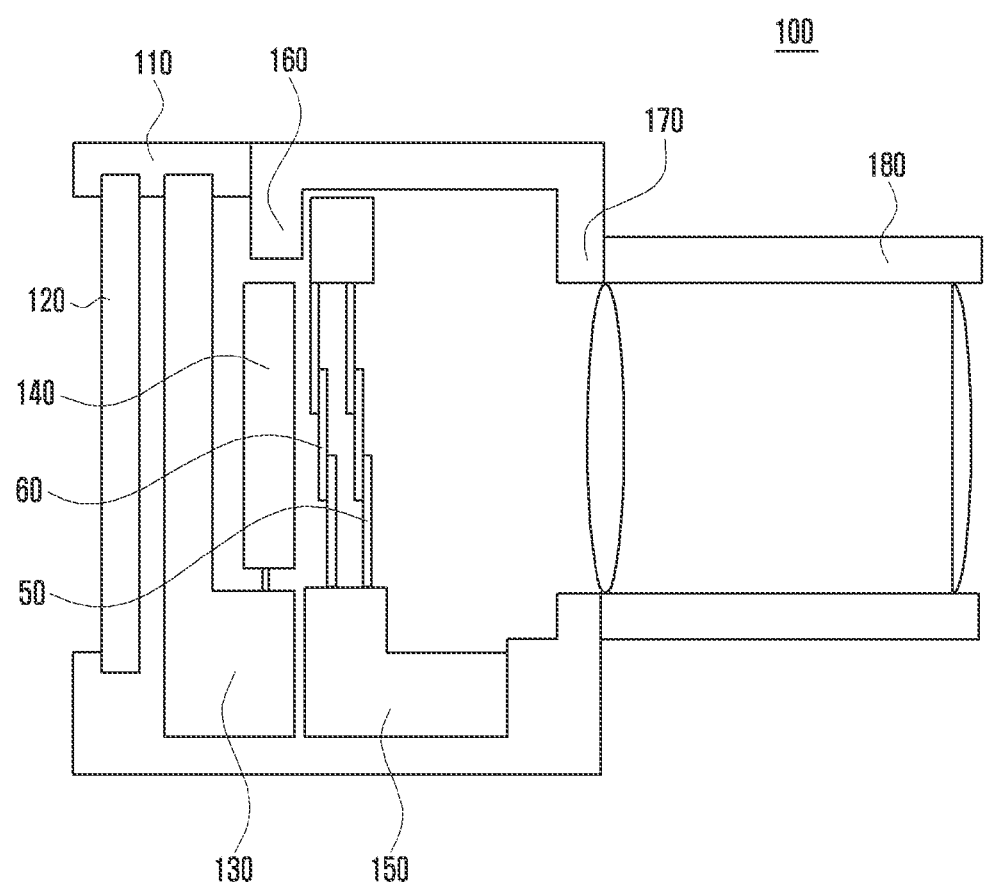
FIG. 1 is a schematic cross-sectional view of a camera device according to an exemplary embodiment of the present invention.

FIG. 1 is a schematic cross-sectional view of a camera device according to an exemplary embodiment of the present invention.

Referring to FIG. 1, a camera device 100, according to the present exemplary embodiment, includes a case 110, a display unit 120, an image processor 130, a sensor array 140, a shutter driving system 150, a mount 160, a lens connector 170, and a lens 180. The camera device 100 may further include a mirror (not shown) and a reflector lens (not shown), or include a lens for viewing a subject, according to the type of a camera.

The camera device 100, having such a configuration according to the present exemplary embodiment, provides an exposure process for capturing an image by applying a cam gear (not shown) and an electromagnet (not shown) to the shutter driving system 150 and operating a front-curtain 50 and a rear-curtain 60 in a predetermined sequence according to the operations of the cam gear and the electromagnet. Because the camera device 100 executes the exposure process by using the cam gear and the electromagnet, the size of the shutter driving system 150 for an operation control of the front-curtain 50 and the rear-curtain 60 may be reduced and various operations such as a single shot mode, a continuous shot mode, and an electronic front-curtain mode may be supported at a high speed as compared to the related-art.

The case 110 surrounds the edges of the display unit 120 so as to allow the display unit 120 to be viewable, and may be connected to the lens 180. The case 110 encases the image processor 130, the sensor array 140, the shutter driving system 150, and the mount 160, and the lens connector 170 is disposed at a location connecting the case 110 to the lens 180. The case 110 may be formed of at least one of various materials including a plastic, a metal, and any other similar and/or suitable type of material, and an aesthetic appearance of a camera may be provided according to a designer's intention by using the above described components.

The display unit 120 is supported by the case 110 and displays an image collected or captured by the sensor array 140. Furthermore, the display unit 120 displays various setting screens used for controlling and/or operating the camera device 100. The screens that are output by the display unit 120 are controlled by the image processor 130. Various information related to the controlling and/or operating of the camera device 100, for example, an aperture value and an International Organization for Standardization (ISO) speed value, is displayed on the display unit 120. In particular, the display unit 120 displays an operation mode of the camera device 100 selected from among a single shot mode, a continuous shot mode, an electronic front-curtain mode, and any other similar and/or suitable operation mode. The camera device 100 may further include a view finder for viewing a subject.

The image processor 130 is a unit outputting an image collected by the sensor array 140 or an image captured by photographing an image displayed on the display unit 120. Namely, if an image corresponding to a subject is projected through the lens 180 onto the sensor array 140, the image processor 130 reads light of the image projected onto the sensor array 140 and outputs the image to the display unit 120 after processing the light of the image into an output form. In photographing an image projected onto the sensor array 140, the image processor 130 controls to process the image and save the image as a photo image by adjusting the image according to a predefined specification if an input signal for saving the image is generated. The camera device 100 may further include a memory (not shown) for saving an image and for saving any operation program of the camera device 100.

In particular, the image processor 130 controls the opening part 30 and the shutter driving system 150 in order to provide a preview image, and controls obtaining of an image between exposures of the sensor array 140. Namely, the image processor 130 controls maintaining of the opening part 30 of the shutter driving system 150 to be open during a process of providing a preview image. Accordingly, if incident light passes through the lens 180 and is projected onto the sensor array 140, then the image processor 130 processes the projected light into an image and outputs the image to the display unit 120.

If a shutter input signal is generated for photographing an image, then the image processor 130 generates a photo image by controlling the shutter driving system 150 in order to open or close the front-curtain 50 and the rear-curtain 60 in a predetermined sequence for providing an exposure time through a slit gap between the front-curtain 50 and the rear-curtain 60, and by processing light projected onto the sensor array 140 for a corresponding exposure time. In particular, the image processor 130 generates a slit gap through a drive control of a motor, the cam gear, and the electromagnet included in the shutter driving system 150 according to an exposure time set by a user or set in the camera device 100. Hereinafter, the drive control of the image processor 130 for the shutter driving system 150 will be discussed in more detail.

The sensor array 140 is an array of sensors collecting information corresponding to incident light passing through the lens 180. The sensor array 140 is configured with photo sensors for collecting information corresponding to the incident light in a predetermined form, and the information is provided as a preview image or a photo image after processing of the information by the image processor 130. The number of sensors disposed in the sensor array 140 may vary according to the number of pixels supported by a corresponding camera device 100.

The mount 160 is a component for fixing and/or attaching the shutter driving system 150 at a side of the case 110. The lens connector 170 is configured to be aligned with the opening part 30 of the shutter driving system 150 fixed by the mount 160. The lens connector 170 may be formed with a screw thread for attachment and detachment of the lens 180, and may further include a cover joint structure separately prepared to prevent inflow of foreign substances.

The lens 180 may be detachably inserted into the lens connector 170 or may be permanently fixed according to a model of the camera device 100. The lens 180 includes at least a convex mirror and a concave mirror to project light of a subject onto the sensor array 140. The lens 180 may provide an automatic focusing function by automatically adjusting a distance between the mirrors according to a user's control or a control of the image processor 130. The lens 180 may be provided in various forms according to a model of camera and a user's preference.

The shutter driving system 150 drives a shutter in order to take a photo image in the camera device 100. The shutter driving system 150 includes the front-curtain 50 and the rear-curtain 60, and includes components (not shown) for driving the front-curtain 50 and the rear-curtain 60. The shutter driving system 150 controls an opening and closing operations of the front-curtain 50 and the rear-curtain 60 in order to provide a preview image and a photo image. Namely, the shutter driving system 150 controls opening of the opening parts 30 of the front-curtain 50 and the rear-curtain 60 in order to provide a preview image, and controls the front-curtain 50 and the rear-curtain 60 to generate a slit gap for an exposure of the photo image. A configuration of the shutter driving system 150 will be discussed in more detail below.

Figure 2:
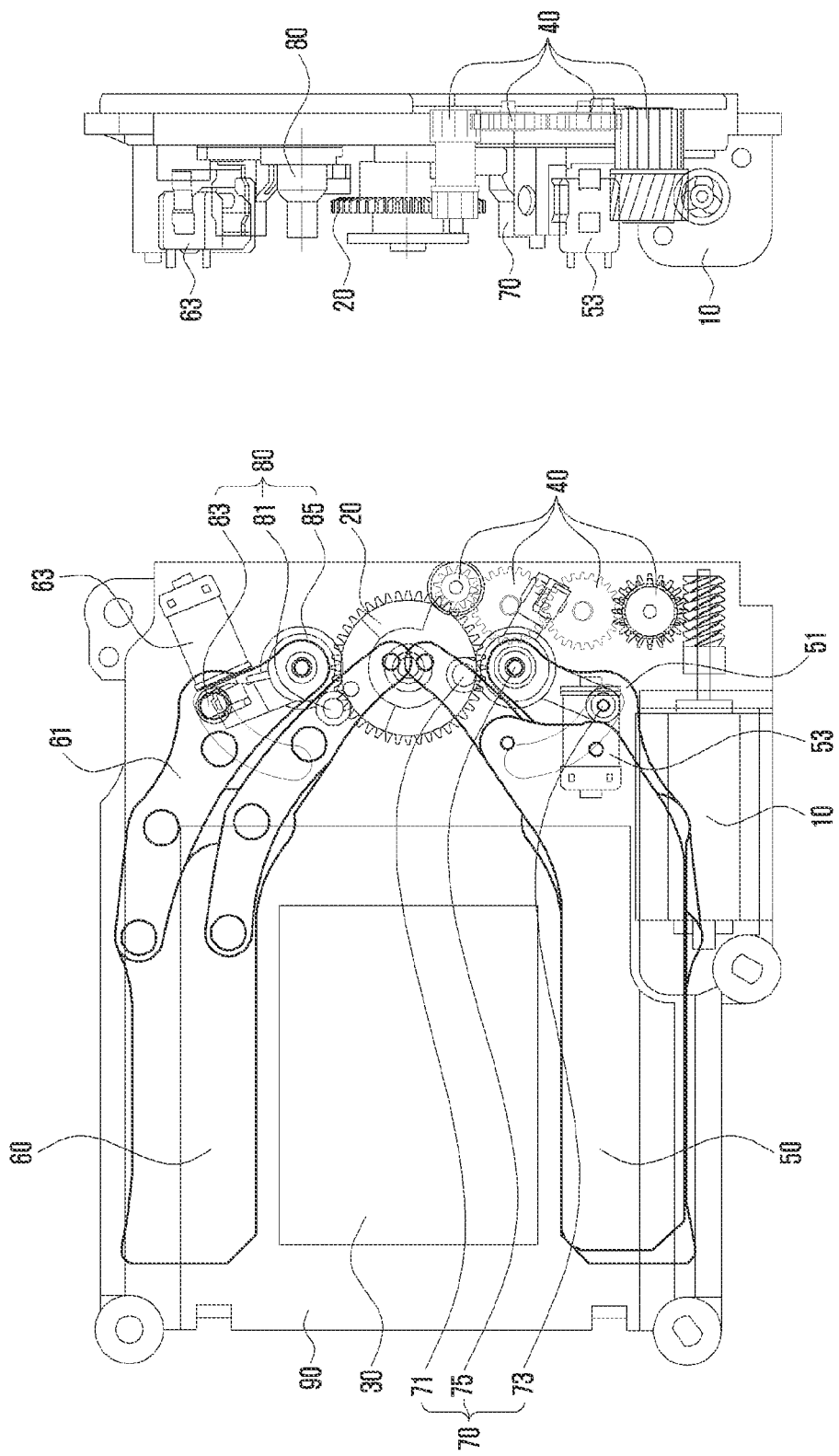
FIG. 2 is a drawing showing a more detailed configuration of a shutter driving system according to an exemplary embodiment of the present invention.

FIG. 2 is a drawing showing a more detailed configuration of a shutter driving system according to an exemplary embodiment of the present invention.

Referring to FIG. 2, the shutter driving system 150, according to the present exemplary embodiment, includes a base plate 90, the front-curtain 50, the rear-curtain 60, a front-curtain link 51, a rear-curtain link 61, a front-curtain electromagnet 53, a rear-curtain electromagnet 63, a front-curtain drive lever 70, a rear-curtain drive lever 80, a cam gear 20, a motor 10, and a reduction gear train 40. Additionally a cover plate may be disposed in front of the base plate 90.

The shutter driving system 150, having the above described configuration, includes an opening part 30, which is disposed on the base plate 90 so as to be aligned with the center of the lens connector 170. The front-curtain 50 is disposed at the lower side of the opening part 30 on the base plate 90, and the rear-curtain 60 is disposed at the upper side of the opening part 30. The shutter driving system 150 includes the front-curtain drive lever 70 and the rear-curtain drive lever 80 connecting to the cam gear 20 in order to provide a state change of opening or closing the front-curtain 50 and the rear-curtain 60, and for selectively maintaining a standstill state by the front-curtain electromagnet 53 and the rear-curtain electromagnet 63.

In the shutter driving system 150, the front-curtain 50 and the rear-curtain 60 are configured with at least one blade. For example, 3 blades may be disposed respectively to the front-curtain link 51 and the rear-curtain link 61, and the opening part 30 of the base plate 90 opens or closes according to folding and unfolding operations of the respective blades disposed to the front-curtain link 51 and the rear-curtain link 61. For this, each blade is connected to the front-curtain link 51 and the rear-curtain link 61 by using a spring device (not shown). The respective blades disposed to the front-curtain link 51 and the rear-curtain link 61 are folded or unfolded according to the operation respectively of the front-curtain drive lever 70 and the rear-curtain drive lever. In more detail, the front-curtain link 51 has an unfolding state while the front-curtain drive lever 70 travels along a front-curtain gear line of the cam gear 20, and thereby the front-curtain 50 becomes to close the opening part 30 in this state. The rear-curtain link 61 has a folding state while the rear-curtain drive lever 80 travels along a rear-curtain gear line of the cam gear 20, and thereby the rear-curtain 60 becomes to open the opening part 30.

The front-curtain drive lever 70 includes a first roller 71 rotating in contact with the front-curtain gear line of the cam gear 20 and a first elastic member 75 that increases its elastic force according to the rotation of the first roller 71. The front-curtain drive lever 70 includes a first link 73 in order to support the folding or the unfolding operation of the front-curtain link 51 according to the rotation of the first roller 71, and includes a front-curtain drive lever body (not shown). The first elastic member 75 has a compression period corresponding to the elastic force generated by a winding operation while the first roller 71 rotates along the front-curtain gear line of the cam gear 20, and a returning operation is performed by removing the elastic force if the first roller 71 reaches a region of the cam gear 20 in which the front-curtain gear line is not formed. The body of the front-curtain drive lever 70 rotates according to the rotation of the first roller 71, and thereby the first link 73 disposed at a side of the front-curtain drive lever 70 may rotate. As a result, the first front-curtain link 51 connected to the first link 73 may perform a folding operation.

The front-curtain drive lever 70 may maintain a standstill state generated by the front-curtain electromagnet 53, even if the elastic force applied to the first elastic member 75 is removed. The front-curtain drive lever 70 is connected to the front-curtain link 51 through the first link 73, and the front-curtain link 51 is unfolded by the first link 73 if the first roller 71 of the front-curtain drive lever 70 rotates along the front-curtain gear line of the cam gear 20.

The body of the front-curtain drive lever 70 contacts the front-curtain electromagnet 53, and the front-curtain drive lever 70 maintains a standstill state, i.e., a state in which the front-curtain 50 has closed the opening part 30, as generated by the front-curtain electromagnet 53, if an electric power is supplied to the front-curtain electromagnet 53. If the electric power that is supplied to the front-curtain electromagnet 53 is shut off, then the first elastic member 75, which is included in the front-curtain drive lever 70, returns to its original position by using the compressed elastic force, and thereby the front-curtain link 51 returns to its original position by the rotation of the first link 73. Accordingly, the front-curtain 50, which is connected to the front-curtain link 51, changes a state of the opening part 30 from a closed state to an open state.

The front-curtain drive lever 70 maintains the front-curtain 50 in a folded state if the opening part 30 is in the open state in order to provide a preview screen. Here, an additional winding operation of the first roller 71 is not applied to the front-curtain drive lever 70, and thereby the first elastic member 75 remains in a state in which the elastic force is removed.

The rear-curtain drive lever 80 includes a second roller 81 performing a winding operation contacting with the rear-curtain gear line of the cam gear 20, a second elastic member 85 increasing an elastic force by the winding operation of the second roller 81, a second link 83 connected to the rear-curtain link 61, and a rear-curtain drive lever body. The second roller 81 winds up the second elastic member 85 while rotating along the rear-curtain gear line of the cam gear 20, and thereby the second elastic member 85 increases the elastic force by being compressed. If the second roller 81 reaches a region of the cam gear 20 in which the rear-curtain gear line is not formed, then the second elastic member 85 returns to its original state by removing the elastic force. Here, the rear-curtain drive lever 80 maintains a standstill state by the rear-curtain electromagnet 63 even if the second elastic member 85 removes the elastic force. Meanwhile, the body of the rear-curtain drive lever 80 rotates according to the rotation of the second roller 81, and thereby the second link 83, which is disposed at a side of the rear-curtain drive lever 80, rotates. As a result, the second front-curtain link 51 connected to the second link 83 may perform an unfolding operation.

The drive mechanism of the rear-curtain drive lever 80 may be substantially similar to that of the front-curtain drive lever 70. However, a difference is that the rear-curtain drive lever 80 rotates in the opposite direction to that of the front-curtain drive lever 70 and has a different arrangement so that the rear-curtain 60 provides a slit gap for an exposure by operating with the front-curtain 50.

In more detail, the rear-curtain drive lever 80 maintains the second roller 81 in a wound state so that the rear-curtain link 61 remains in a folded state if the opening part 30 is in an open state in order to initially provide a preview screen, as shown in FIG. 2. For this, the second roller 81 of the rear-curtain drive lever 80 rotates along the rear-curtain gear line provided in the cam gear 20 and the second elastic member 85, which operates according to the rotation of the second roller 81, remains in a state where the elastic force is increased by the winding operation of the second roller 81. Namely, the second elastic member 85 has a state where a spring is tightened by the second roller 81. As a result, the second elastic member 85, which is included in the rear-curtain drive lever 80, remains in a state where the elastic force is increased if the rear-curtain 60 opens the opening part 30, and the rear-curtain link 61 remains in a folded state due to the rear-curtain drive lever 80. Here, the second elastic member 85 is mechanically fixed by the cam gear 20. Accordingly, the rear-curtain 60 can maintain an open state of the rear-curtain 60 even if the electric power is not supplied to the electromagnet 63.

When the rear-curtain 60 closes the opening part 30 for photographing, the rear-curtain 60 changes from a mechanically fixed state to a state fixed by the rear-curtain electromagnet 63. While the front-curtain electromagnet 53, which is for fixing a position of the front-curtain 50, changes the opening part 30 of the front-curtain 50 from a closed state to an open state according to the control of the image processor 130, the rear-curtain 60 changes the opening part 30 from an open state to a closed state. A slit gap corresponding to a set exposure time is formed between the operations of the rear-curtain 60 and the front-curtain 50, and the formed slit gap moves vertically by a falling-down movement of the open rear-curtain 60 and a falling-down movement of the closed front-curtain 50. As a result, incident light passing through the slit gap may be projected onto selected sensors of the sensor array 140, and the image processor 130 may perform an image photographing by collecting information corresponding to the light projected onto the sensor array 140.

In the above description, the first elastic member 75 and the second elastic member 85, which are disposed respectively in the front-curtain drive lever 70 and the rear-curtain drive lever 80, are provided in a spring form, and have a function that an elastic force is increased by tightening of the winding operation of the first roller 71 and the second roller 81. However, the present invention is not limited thereto, and the first elastic member 75 and the second elastic member may be in other forms besides the spring form, such as a rubber form, a polymer form, or any other similar and/or suitable form that provides an elastic force. The first elastic member 75 and the second elastic member 85 operate the front-curtain 50 in order to change the opening part 30 from a closed state to an open state or in order to operate the rear-curtain 60 so as to change the opening part 30 from an open state to a closed state, according to a winding and unwinding operation control of the image processor 130.

The cam gear 20 includes a front-curtain gear line (not shown) and a rear-curtain gear line (not shown) so that the first roller 71 and the second roller 81, which are respectively of the front-curtain drive lever 70 and the rear-curtain drive lever 80, can rotate. Here, the front-curtain gear line and the rear-curtain gear line are respectively formed at different locations so that the front-curtain drive lever 70 and the rear-curtain drive lever 80 have respective and different operation times. The cam gear 20 is connected to a reduction gear train 40, and rotates at a predetermined speed according to the rotation of the reduction gear train 40. The cam gear 20 causes the front-curtain drive lever 70 and the rear-curtain drive lever 80 to have a mechanically wound state. The shape of the cam gear 20 will be described below in more detail.

The motor 10 rotates at a preset speed according to a supply of an electric power and transfers a rotation power to the reduction gear train 40. The operation time of the motor 10 corresponds to a photographing time. Namely, the front-curtain 50 and the rear-curtain 60 of the shutter operate according to the control of the image processor 130 in order to control the cam gear 20 so as to open or close the opening part 30. A gear (not shown) is disposed at an end of the motor 10, and the gear disposed at the end of the motor 10 is connected to the reduction gear train 40 in order to rotate the reduction gear train 40. The reduction gear train 40 has a configuration including at least two sequential gears and transfers the rotation power of the motor 10 to the cam gear 20.

The reduction gear train 40 transfers the rotation power to the cam gear 20 by reducing the revolution count of the motor 10. Even though four disposed gears are shown in the figures of the present exemplary embodiments, as described above, the number of the reduction gear train 40 may vary according to a designer's intention. The number of the reduction gear train 40 may vary according to the size of an installation space of a camera. Namely, the number of gears in the reduction gear train 40 may be decreased if the installation space is big enough. The size of the gears may be reduced if the installation space is not big enough or if space saving is needed, and thereby the number of gears in the reduction gear train 40 is increased. As described above, the reduction gear train 40 of the camera device 100 may vary according to an installation space and a designer's intention. Hereinafter, the operation mechanism of the shutter driving system 150 will be described in more detail referring to the attached drawings.

Figure 3:
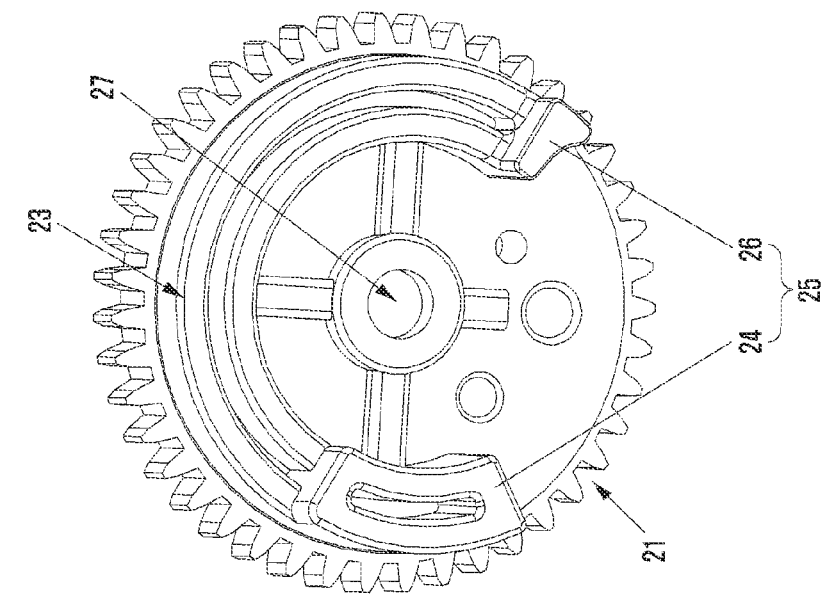
FIG. 3 is a drawing showing a detailed configuration of a cam gear according to an exemplary embodiment of the present invention.
Figure 3:
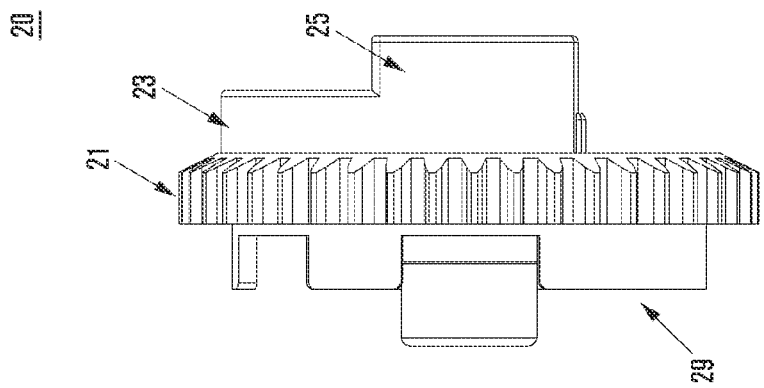
Figure 3:
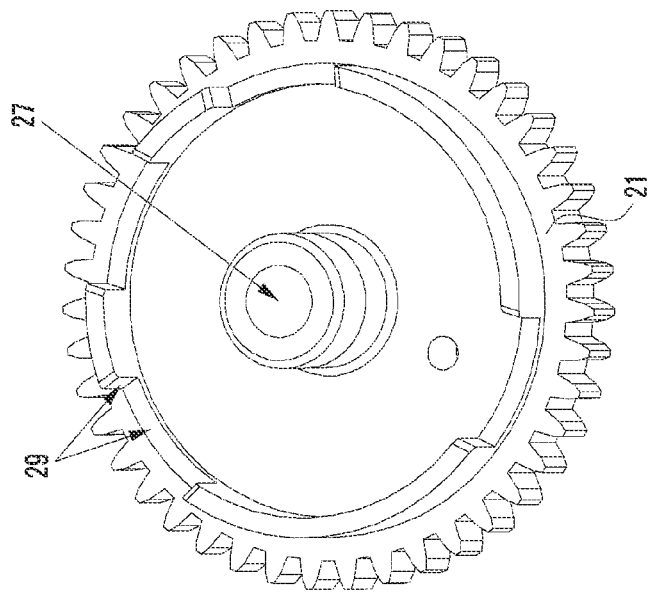

FIG. 3 is a drawing showing a detailed configuration of a cam gear according to an exemplary embodiment of the present invention Referring to FIG. 3, the cam gear 20, according to the present exemplary embodiments, includes a gear body 21 having mountains and a valleys along a circumference of a disc type shape of the gear body 21 for connecting to the reduction gear train 40, a front-curtain gear line 25 and a rear-curtain gear line 23, which are formed, on a same side, such as a front side of the gear body 21, and an electromagnet position identification structure 29 formed at a rear side of the gear body 21. A fixing hole 27 may be formed so as to allow rotation at the center of the cam gear 20 in order to fix the gear body 21 to the base plate 90. The cam gear 20 rotates according to a rotation power that is generated by the motor 10 and is transferred through the reduction gear train 40 if a shutter input operation, i.e., a shutter release operation, is generated for photographing an image.

The cam gear 20 rotates so as to move the rear-curtain 60 to have a closed state and an open state for each full rotation, i.e., a rotation of 360 degrees, and so as to move the front-curtain 50 to have at least a closed state and an open state according to a photographing mode. For example, in a single shot mode, the front-curtain 50 has two occurrences of each of the closed state and the open state, as generated by the front-curtain gear line 25 and the front-curtain electromagnet 53 of the cam gear 20, and in a continuous shot mode, the front-curtain 50 has one occurrence of each of the closed state and the open state, as generated by the front-curtain gear line 25 of the cam gear 20.

The rear-curtain gear line 23 has a smaller diameter than that of the gear body 21 in a regular height, and may be formed as a partial circular band. The rear-curtain gear line 23 is formed to cover a predetermined range of an angle, for example, up to 240 degrees, so that the rear-curtain 60 may mechanically open the opening part 30 by folding the rear-curtain link 61 while in a preview state. Accordingly, in the process of the second roller 81 rotating along the rear-curtain gear line 23 of the cam gear 20, the rear-curtain 60 maintains the opening part 30 to be in a mechanically open state while the cam gear 20 rotates in a range up to 240 degrees.

In a state where the rear-curtain 60 maintains the opening part 30 to be open, the second roller 81 of the rear-curtain drive lever 80 may reach a region in which the rear-curtain gear line 23 is not formed. However, in this case, the second elastic member 85 of the rear-curtain drive lever 80 returns to its original position by controlling the rear-curtain electromagnet 63 to be in a standby state, and thus, does not return to its original position by removing an elastic force. The closing time of the opening part 30 of the rear-curtain 60 is determined in order to form a predetermined slit gap according to the opening time of the opening part 30 of the front-curtain 50, as described above. Accordingly, if an input, such as a user generated input signal and/or command, for photographing an image is generated while the rear-curtain 60 maintains the opening part 30 in a mechanically open state, then the image processor 130 controls the rear-curtain 60 so as to maintain the opening part 30 in the mechanically open state by using the rear-curtain electromagnet 63. The image processor 130 controls the opening time of the opening part 30 of the front-curtain 50 by controlling the front-curtain electromagnet 53.

The front-curtain gear line 25 is formed at the upper side of the rear-curtain gear line 23 in a smaller range than that of the rear-curtain gear line 23. In particular, the front-curtain gear line 25 includes a first front-curtain gear segment 24 and a second front-curtain gear segment 26 in order to support two executions of opening and closing in a single shot mode. The first front-curtain gear segment 24 is formed at the front end of the rear-curtain gear line 23, and the second front-curtain gear segment 26 is formed at the rear end of the rear-curtain gear line 23.

Accordingly, the first roller 71 of the front-curtain drive lever 70 is wound while moving along the sidewall of the first front-curtain gear segment 24 in order to support the front-curtain 50 so as to close the opening part 30, and is wound again while moving along the sidewall of the second front-curtain gear segment 26 in order to support the front-curtain so as to close the opening part 30. If the front-curtain 50 closes the opening part 30, then the image processor 130 adjusts the opening time of the front-curtain 50 by controlling the front-curtain electromagnet 53.

As described above, the image processor 130 uses state information of the front-curtain electromagnet 53 and the rear-curtain electromagnet 63 in order to control the opening time of the front-curtain 50 and the rear-curtain 60, and thereby the cam gear 20 has the electromagnet position identification structure 29 so as to identify the position of the electromagnet. The electromagnet position identification structure 29 is disposed in a manner corresponding to the front-curtain gear line 25 and the rear-curtain gear line 23, and is formed as a structure having a mountain and a valley, wherein a supply time of electric power corresponds to the valley, i.e., a region having a height difference. The shutter driving system 150 includes Position Identification (PI) sensors in order to detect a height difference range of the electromagnet position identification structure 29. The shutter driving system 150 includes a PI sensor for detecting a state of the front-curtain electromagnet 53 and another PI sensor for detecting a state of the rear-curtain electromagnet 63, and the PI sensors transfer information of an electromagnet's position to the image processor 130 by detecting the electromagnet position identification structure 29.

The image processor 130 identifies a current state of the electromagnet based on the information provided by the PI sensor, and generates a time difference between the opening time of the opening part 30 of the front-curtain 50 and the closing time of the opening part 30 of the rear-curtain 60 in order to provide a slit gap corresponding to a set exposure value. The time difference substantially corresponds to a time difference between a time for removing magnetic flux of the front-curtain electromagnet 53 and a time for removing magnetic flux of the rear-curtain electromagnet 63.

Figure 4:
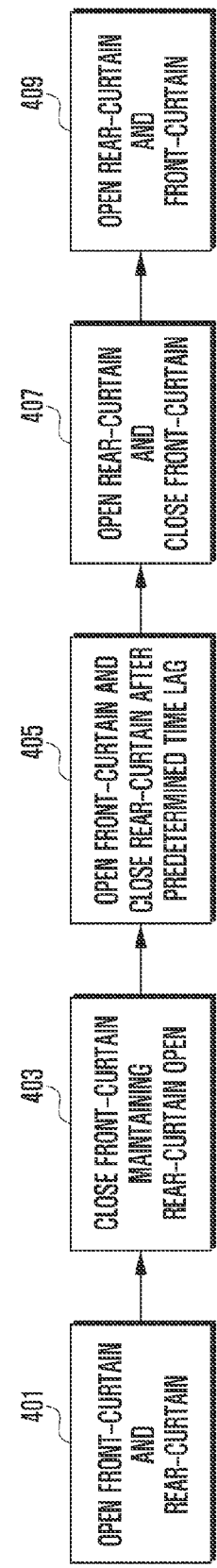
FIG. 4 is a flow chart showing an operation sequence of a shutter driving system according to an exemplary embodiment of the present invention.

FIG. 4 is a flow chart showing an operation sequence of a shutter driving system according to an exemplary embodiment of the present invention. FIGS. 5A to 5E are drawings showing operation states of each component of the shutter driving system according to an exemplary embodiment of the present invention.

Referring to FIGS. 4 and 5A to 5E, if an electric power is supplied to the camera device 100, the camera device 100 initializes an electronic configuration of the camera device 100 by using the supplied electric power, and performs an operation for a preview mode according to preset schedule information. The opening part 30 maintains an open state in order to provide a preview image, and for this, the shutter driving system 150 controls the states of the front-curtain 50 and the rear-curtain 60. In the shutter driving system 150, the rear-curtain 60 is in an open state of the opening part 30 according to a mechanical operation of the cam gear 20 and the rear-curtain drive lever 80, and the front-curtain 50 initially is in an open state of the opening part 30 by maintaining the front-curtain link 51 in a folded state.

Figure 5A:
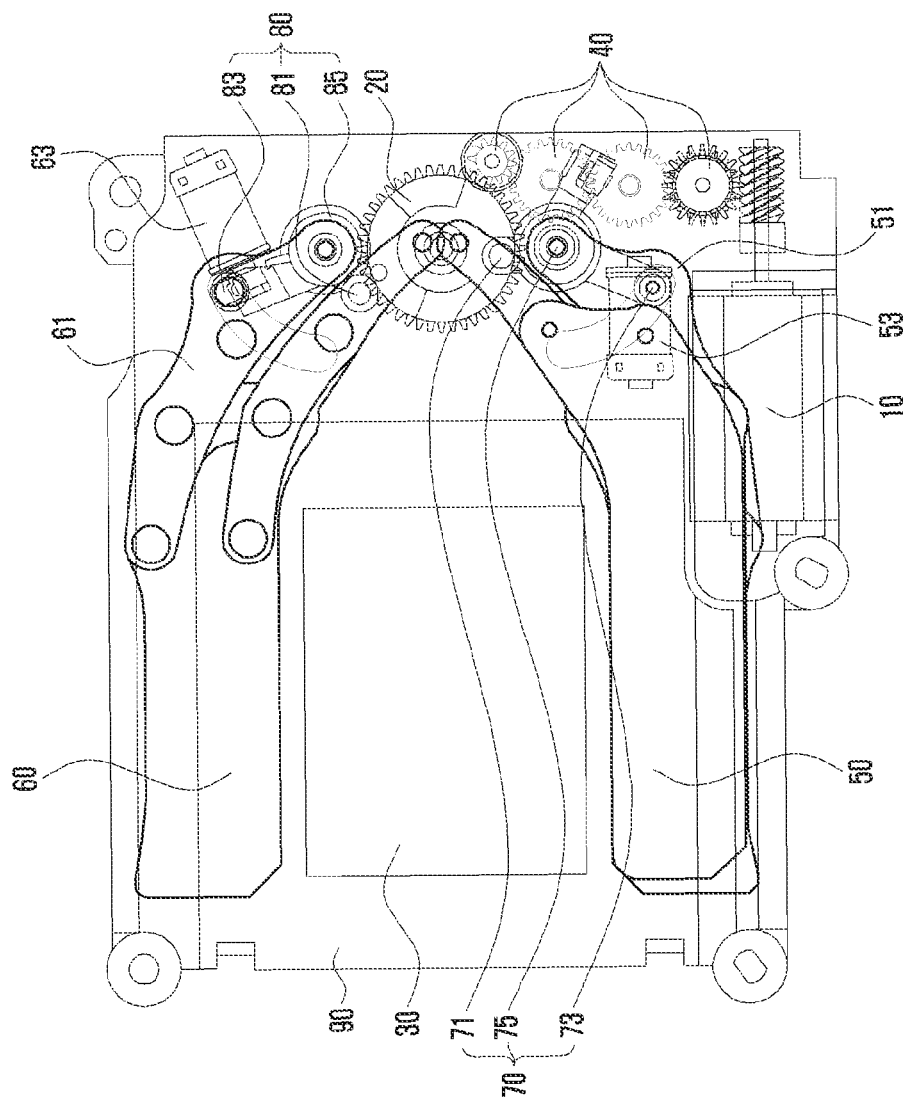
FIGS. 5A to 5E are drawings showing operation states of each component of the shutter driving system according to an exemplary embodiment of the present invention.

As described above, the shutter driving system 150 of the camera device 100 is in an open state of the rear-curtain 60 and an open state of the front-curtain 50, as shown in step 401 of FIG. 4 and FIG. 5A. Accordingly, incident light passes through the lens 180 and the lens connector 170 and is then projected onto the sensor array 140 through the opening part 30, and the camera device 100 provides a preview image by collecting the incident light. The camera device 100 performs a predetermined image processing in order to provide the preview image.

In step 401 of FIG. 4 and FIG. 5A, the front-curtain drive lever 70 maintains the front-curtain link 51 in a folded state in order to maintain the front-curtain 50 in an open state, and the first elastic member 75 disposed internally is in a loose state without additional increase of the elastic force. The front-curtain 50 and the front-curtain link 51 close the opening part 30 by a winding operation of the first roller 71 of the front-curtain drive lever 70, and open the opening part 30 if the elastic force of the first elastic member 75, which is increased by the winding operation of the first roller 71, is removed.

The rear-curtain drive lever 80 maintains the rear-curtain link 61 in a folded state for an open state of the opening part 30 of the rear-curtain 60. The rear-curtain drive lever 80 opens the opening part 30 to be in a state wherein the second elastic member 85 increases the elastic force by a winding operation of the second roller 81 moving along the rear-curtain gear line 23 of the cam gear 20. The opening part 30, which was previously in the open state, is closed if the elastic force of the second elastic member 85, which is disposed in the rear-curtain drive lever 80, is removed.

In order to secure stability of the first and second elastic members 75 and 85, which are disposed in the rear-curtain drive lever 80 and the front-curtain drive lever 70, the camera device 100 substantially maintains a state of removing the elastic force if an electric power is not supplied. Namely, in the camera device 100, the rear-curtain drive lever 80 mechanically supports the rear-curtain 60 in order to maintain the opening part 30 in a closed state by controlling the rotation range of the cam gear 20, and the front-curtain 50 mechanically supports the front-curtain drive lever 70 in order to maintain the opening part 30 in an open state.

For this, the first and second rollers 71 and 81 are first disposed to be in a range of the cam gear 20 in which the rear-curtain gear line 23 and the front-curtain gear line 25 are not formed. Referring to FIG. 3, the first roller 71 of the rear-curtain drive lever 80 is disposed at the left side of the ranges in which the rear-curtain gear line 23 and the front-curtain gear line 25 of the cam gear 20 are not formed, and the second roller 81 of the front-curtain drive lever 70 is disposed at the right side of the ranges in which the rear-curtain gear line 23 and the front-curtain gear line 25 are not formed. Here, the first and second rollers 71 and 81 are not located on either of the rear-curtain gear line 23 and the front-curtain gear line 25, and thereby do not generate a rolling operation. As a result, a state of elastic forces being removed from the first and second elastic members 75 and 85 is provided. In this process, the camera device 100 maintains a closed state of the opening part 30 via the rear-curtain 60.

If the camera device 100 is switched on, then the camera device 100 supplies an electric power to the motor 10 and rotates the cam gear 20 to a predetermined angle. Referring to FIG. 3, the cam gear 20 is provided so as to rotate in the counterclockwise direction. The first roller 71 of the rear-curtain drive lever 80 rotate along the rear-curtain gear line 23 formed at the front surface of the gear body 21 of the cam gear 20, the front-curtain drive lever body rotates according to the rotation of the first roller 71, and thereby the first elastic member 75 increases an elastic force by a winding operation. The rear-curtain link 61, which is connected to the rear-curtain drive lever 80, operates the front-curtain 50 which closed the opening part 30 in order to be in a folded state, and thereby the opening part 30 is in an open state.

Because the second roller 81 of the front-curtain drive lever 70 rotates in a range in which the rear-curtain gear line 23 and front-curtain gear line 25 are not formed, a rolling operation is not generated. Accordingly, the front-curtain drive lever 70 does not operate the front-curtain link 51. As a result, while the cam gear 20 maintains a rotation state within a predetermined angle, the rear-curtain 60 opens the opening part 30, and an elastic force is applied to the first elastic member 75. Here, the front-curtain 50 maintains the opening part 30 to be in an initially open state even if the cam gear 20 rotates to the predetermined angle.

As described above, while the rear-curtain 60 and the front-curtain 50 are maintained in an open state, the camera device 100 provides the rear-curtain 60 and the front-curtain 50 to have an open state by using mechanical structures, such as the cam gear 20 and the first roller 71 of the rear-curtain drive lever 80. Accordingly, if an electric power is not supplied to the front-curtain electromagnet 53 and the rear-curtain electromagnet 63, then the front-curtain electromagnet 53 and the rear-curtain electromagnet 63 remain in a standby state. The rear-curtain drive lever 80 is disposed so as to contact the rear-curtain electromagnet 63, however in this state, the location of the rear-curtain drive lever 80 is maintained by a mechanical operation of the cam gear 20. In a preview mode, an image captured through the sensor array 140 is provided to the display unit 120.

If a shutter input signal is generated, then the camera device 100 executes steps 403 to 409 as shown in FIGS. 5B to 5E for photographing an image. Hereinafter, each step will be explained based on the single shot mode. However, the present invention is not limited thereto, and the steps 403 to 409 may be applied to other similar and/or suitable photographing modes. The camera device 100 may provide a separate mechanical shutter button for the shutter input signal, may provide a display unit 120 having a touch function to output a shutter map corresponding to the shutter button, or may provide any suitable and/or similar element for inputting a shutter input signal. Therefore, the camera device 100 can identify generation of the shutter input signal if the shutter button is pressed or if the shutter map is selected.

Figure 5B:
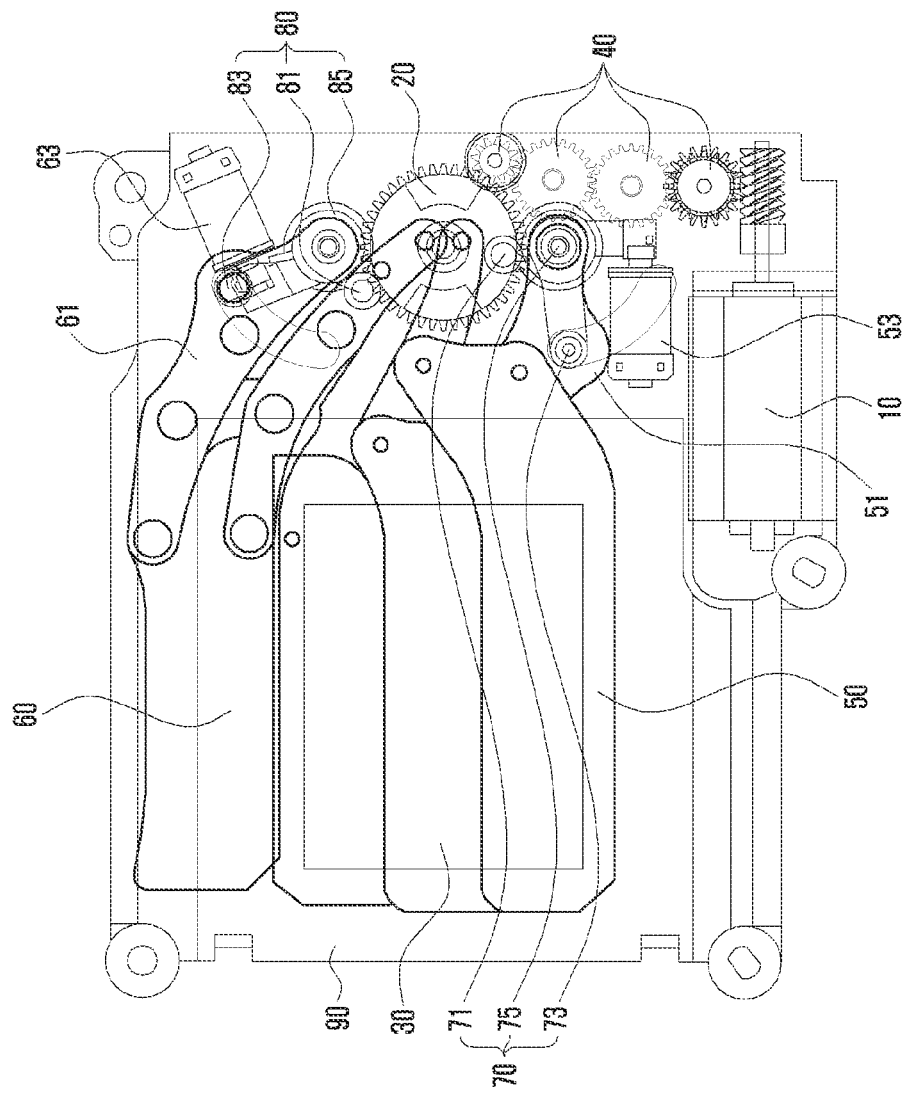

If the shutter input signal is received, the camera device 100 first closes the opening part 30 by driving the front-curtain 50, as shown in step 403 and FIG. 5B. Such an operation provides a black out state to the sensor array 140 by closing the opening part 30. In the black out state, the image processor 130 controls execution of a photographing preparation state by resetting all the sensors in the sensor array 140. For this, the camera device 100 controls the first roller 71 of the front-curtain drive lever 70 to move along the first front-curtain gear line 25 by driving the motor 10 and rotating the cam gear 20. If the first roller 71, which contacts the first front-curtain gear line 25, rotates, then the body of the front-curtain drive lever 70 rotates accordingly and thereby the first link 73 moves so that the front-curtain link 51 is unfolded. In this process, the elastic force of the first elastic member 75 is increased by a winding operation.

The front-curtain drive lever 70 is disposed so that its body contacts with the front-curtain electromagnet 53 while rotating according to the rotation of the first roller 71. In the meantime, if the shutter input signal is generated, then the camera device 100 uses the front-curtain electromagnet 53 to generate a magnetic power by supplying an electric power, and thereby the front-curtain drive lever 70 is fixed by the front-curtain electromagnet 53. If the front-curtain drive lever 70 stops according to the front-curtain electromagnet 53, then the front-curtain link 51 connected to the first link 73 of the front-curtain drive lever 70 provides the front-curtain 50 in order to maintain the opening part 30 in a closed state. Meanwhile, the camera device 100 provides a magnetic power by supplying an electric power to the rear-curtain electromagnet 63. Accordingly, the rear-curtain 60 changes the opening part 30 from a mechanically open state generated by the rear-curtain gear line 23 to an open state generated by the rear-curtain electromagnet 63. In this process, the rear-curtain electromagnet 63 stops the rear-curtain drive lever 80 by using the magnetic power in a state of contacting the body of the rear-curtain drive lever 80.

Figure 5C:
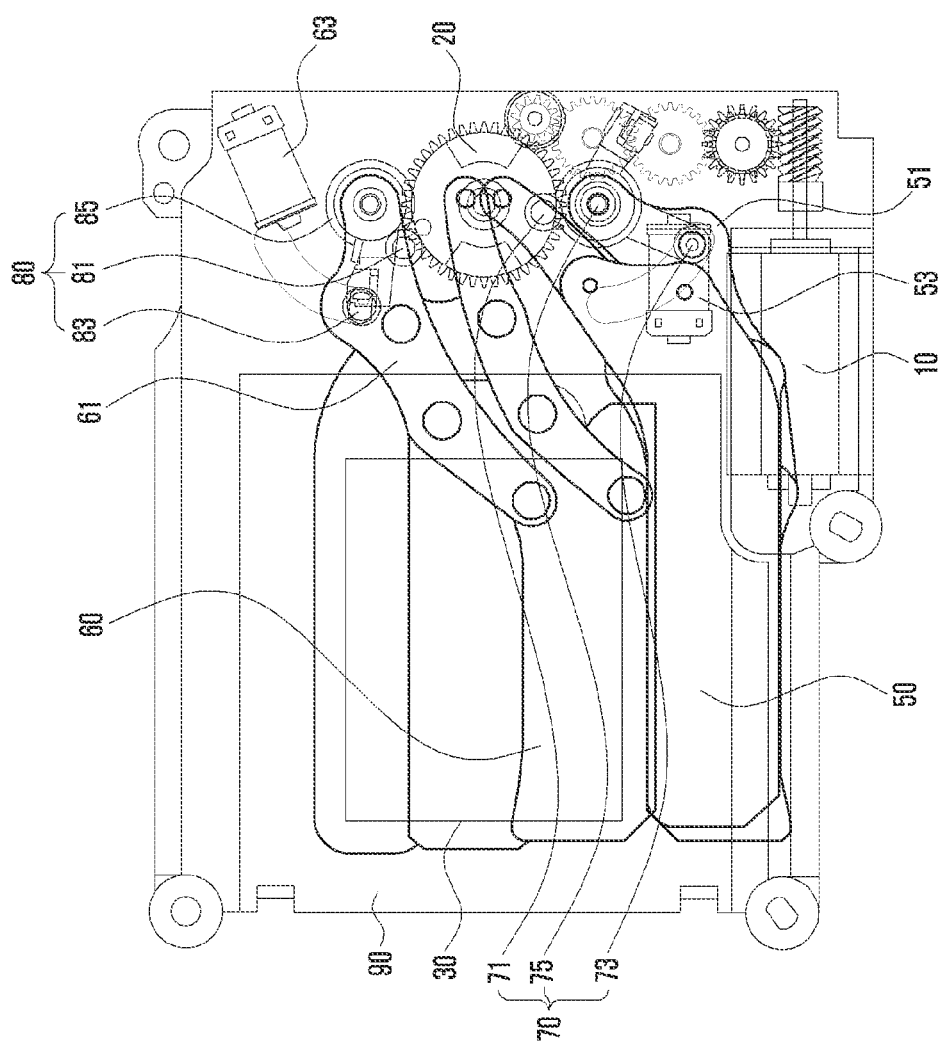

In sequence, the image processor 130 of the camera device 100 controls the front-curtain 50 in order to change the opening part 30 from a closed state to an open state and controls the rear-curtain 60 in order to change the opening part 30 from an open state to a closed state, after a predetermined time lag, as shown in step 405 of FIG. 4 and FIG. 5C. In particular, the image processor 130 first controls the front-curtain 50 so as to change the opening part 30 from an open state to a closed state by removing the magnetic power of the front-curtain electromagnet 53, which is fixed the front-curtain drive lever 70. The image processor 130 then controls the rear-curtain 60 so as to change the opening part 30 from an open state to a closed state by removing the magnetic power of the rear-curtain electromagnet 63, which is fixed the rear-curtain drive lever 80 after a predetermined time interval. Here, the image processor 130 may adjust the slit gap by adjusting a difference between the removing time of the magnetic power of the front-curtain electromagnet 53 and the removing time of the magnetic power of the rear-curtain electromagnet 63. The slit gap relies on the shutter speed of photographing an image.

If the front-curtain 50 and the rear-curtain 60 form a moving slit gap by changing an open state and a closed state, then incident light passing through the slit gap is projected onto the sensor array 140. The image processor 130 then reads information of the corresponding sensor array 140 and processes the information in order to generate a photo image. The photo image may be output to the display unit 120, which may be acting as a view finder according to the control of the image processor 130.

Figure 5D:
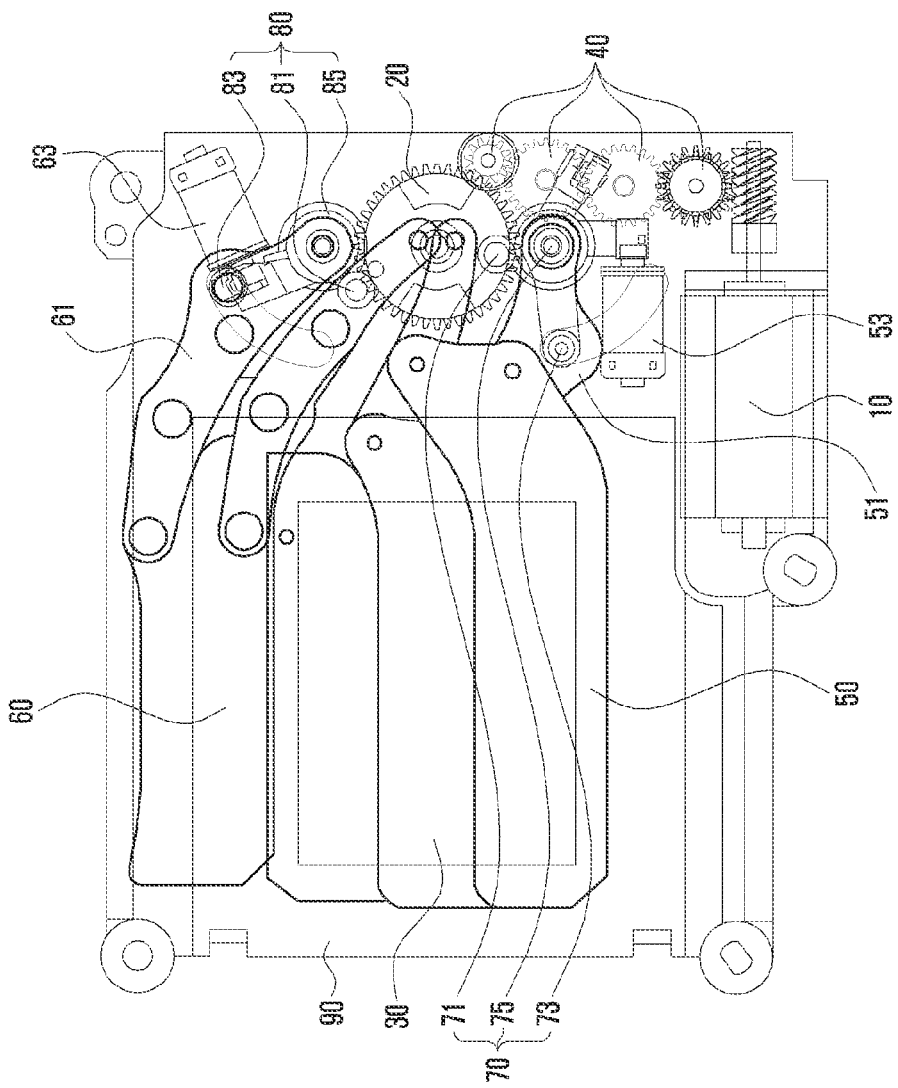

As shown in step 407 of FIG. 4 and FIG. 5D, the shutter driving system 150 of the camera device 100 changes the rear-curtain 60 from a closed state to an open state according to the control of the image processor 130, and changes the front-curtain 50 from an open state to a closed state. Here, the state change of the front-curtain 50 is generated so that the cam gear 20 supports a single shot mode and a continuous shot mode selectively. Namely, in the case of single shot mode, the front-curtain 50 may not move upwards so as to close the opening part 30 in step 407. However, in the case of continuous shot mode, the front-curtain 50 firstly moves so as to close the opening part 30 in step 407, and thereby has the same exposure preparation state as in step 403. Accordingly, the camera device 100, according to the present exemplary embodiment, may maintain a black out state of the sensor array 140 in a continuous shot mode by closing the opening part 30 of the front-curtain 50, and may stably obtain image information of the sensor array 140.

In step 407, the rear-curtain 60 maintains the opening part 30 in a mechanically open state by the rotation of the cam gear 20. Accordingly, the rear-curtain 60 may maintain the open state even if an electric power is not supplied to the rear-curtain electromagnet 63. The front-curtain 50 maintains the opening part 30 in a mechanically closed state by the rotation of the cam gear 20. In particular, the first roller 71 of the front-curtain drive lever 70 rotates along the sidewall of the second front-curtain gear segment 26 of the cam gear 20, and thereby the front-curtain 50 closes the opening part 30 by the winding operation of the first roller 71. Here, the first elastic member 75 of the front-curtain drive lever 70 has a state wherein an elastic force is engaged.

Figure 5E:
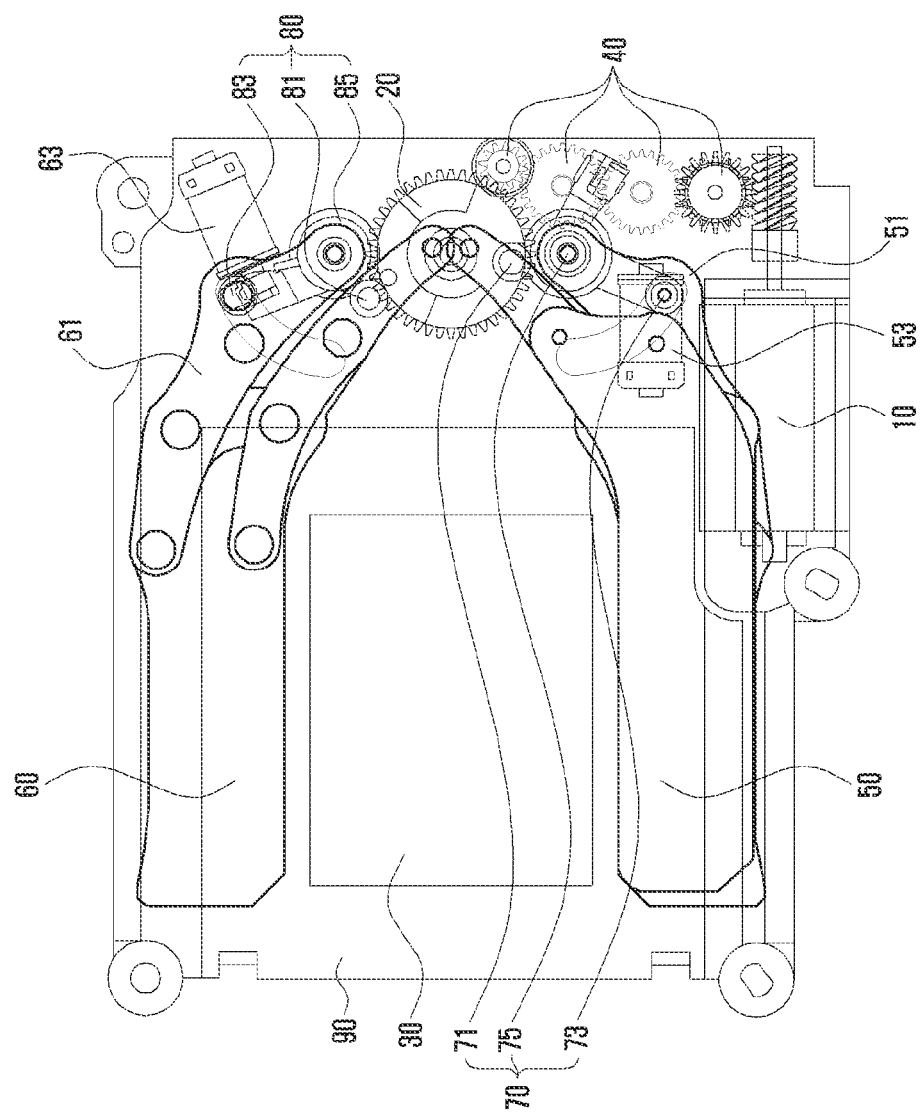

As shown in step 409 of FIG. 4 and FIG. 5E, the shutter driving system 150 controls the front-curtain 50 so as to change from a closed state to an open state. For this, the shutter driving system 150 rotates the cam gear 20 continuously, and thereby, the rolling operation of the first roller 71 stops at the position at which the sidewall of the second front-curtain gear segment 26 of the cam gear 20 ends. Subsequently, the first elastic member 75, which connects to the first roller 71 and maintains the closed state, moves in a direction so as to release the elastic force, and thereby the first link 73 is in a folded state. As a result, the front-curtain 50 changes the opening part 30 from the closed state to the open state corresponding to the operation of the front-curtain link 51 connected to the first link 73. Step 409 and FIG. 5E correspond to the operation of opening the opening part 30 in step 401. In a continuous shot mode, the front-curtain electromagnet 53 has a magnetic power by receiving an electric power, as shown in step 407 and FIG. 5D. The front-curtain 50 which closed the opening part 30 then does not open the opening part 30, as shown in step 409 and FIG. 5E, but has an exposure preparation state, as shown in step 403. Thereafter, steps 403 to 407 are repeated in order to support a continuous shot mode. In the continuous shot mode, a plurality of photo images may be captured by securing the blackout period of the sensor array 140 in a proper condition, and the drive of the front-curtain 50 for the continuous shot mode may be further simplified.

As described above, the shutter driving system 150 and the camera device 100 control the front-curtain 50 and the rear-curtain 60 in order to mechanically open and close according to a front-curtain gear line 25 and a rear-curtain gear line 23 formed on a cam gear 20, and maintains a closed state or an open state and while forming a slit gap according to operations of an electromagnet. Accordingly, the present exemplary embodiments illustrate a smooth and precise operation of a camera by supporting a state change of the front-curtain 50 and the rear-curtain 60, and provide a smooth generation of a slit gap corresponding to camera setting values by using an electromagnet, such as one of the electromagnets 53 and 63, for the control of the generation of the slit gap.

Furthermore, the shutter driving system 150 and the camera device 100 enables a more stable state supported by mechanically providing open and closed states of the front-curtain 50 and the rear-curtain 60 using the cam gear 20, and secures a proper time difference for forming a slit gap by using an electromagnet. In particular, the shutter driving system 150, according to the present exemplary embodiments, enables minimizing of a space needed for the shutter driving system 150 by using the cam gear 20 and the electromagnets 53 and 63.

Hereinafter, a driving method of a camera according to present exemplary embodiments will be discussed by explaining an operation of a cam gear and operation states of the related components for supporting a single shot mode, a continuous shot mode, and an electronic front-curtain mode, based on the aforementioned components of the shutter driving system 150.

Figure 6:
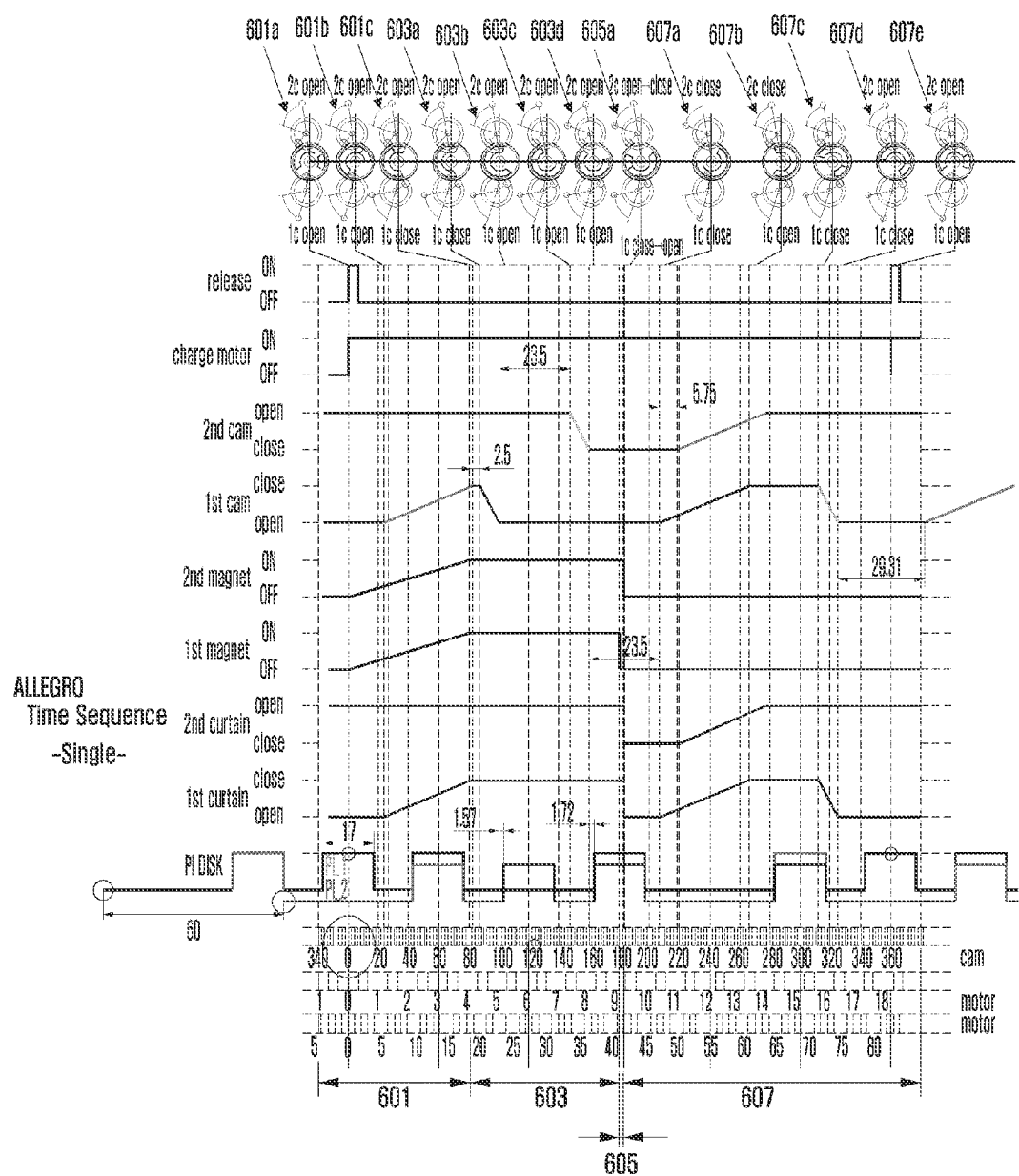
FIG. 6 is a graph showing a timing of a shutter driving system in a single shot mode according to an exemplary embodiment of the present invention.

FIG. 6 is a graph showing a timing of a shutter driving system in a single shot mode according to an exemplary embodiment of the present invention.

Referring to FIG. 6, if a shutter input signal is generated by a shutter release button in section 601 of FIG. 6, then the motor of the shutter driving system 150 rotates according to a supplied electric power. The motor of the shutter driving system 150 may operate until the shutter driving system 150 is initialized since photographing of an image is completed.

The rear-curtain drive lever 80 initially controls an opening part 30 of a rear-curtain 60 so as to change from a closed state to an open state according to the operation of the cam gear 20. The front-curtain drive lever 70 operates the front-curtain 50 so as to change the opening part 30 from an open state to a closed state according to the operation of the cam gear 20. During such operations, an electric power is supplied to the rear-curtain electromagnet 63 and the front-curtain electromagnet 53. The rear-curtain 60 maintains the open state of the opening part 30 according to the operation of the cam gear 20, and the front-curtain 50 gradually shuts down the opening part 30 by using a first front-curtain gear segment 24.

The second roller 81 of the rear-curtain drive lever 80 is located on the rear-curtain gear line 23 of the cam gear 20, as shown at positions 601a, 601b, and 601c shown in FIG. 6, and thereby the rear-curtain drive lever 80 mechanically supports the rear-curtain 60 so as to maintain the open state. At position 601a, the first roller 71 of the front-curtain drive lever 70 is located in a region in which the front-curtain gear line 25 and the rear-curtain gear line 23 are not formed, and thereby, the first roller 71 does not perform a rolling operation even if the cam gear 20 rotates. If the cam gear 20 continues to rotate and reach position 601b, then the first roller 71 enters a sidewall of a first front-curtain gear segment 24, and the first roller 71 of the front-curtain drive lever 70 performs a winding operation. Such an operation may be maintained until the first roller 71 reaches the end point of the first front-curtain gear segment 24, as shown at position 601c. In this step, a closed state of the front-curtain 50 is formed by mechanical operation of the cam gear 20 and the front-curtain drive lever 70. The shutter driving system 150 enables a gradual power supply for the electromagnets 53 and 63 in order to support the operations of the rear-curtain 60 and the front-curtain 50 by performing a mechanical support based on the cam gear 20 having a rear-curtain gear line 23 and a front-curtain gear line 25. This characteristic may be helpful for preventing an abnormal magnetic power and jumping effect of the electromagnets 53 and 63 due to an unstable power supply.

In section 603 of FIG. 6, the motor 10 continues to rotate the cam gear 20, and the rear-curtain drive lever 80 is in a state for opening the rear-curtain 60 while the second roller 81 rotates on the rear-curtain gear line 23. If the second roller 81 of the rear-curtain drive lever 80 reaches a region of the cam gear 20 in which the rear-curtain gear line 23 is not formed, then the rear-curtain drive lever 80 is located at its initial state, i.e., a closed state. The front-curtain drive lever 70 provides the closed state by passing through the first front-curtain gear segment 24 and may be located at an open state. A proper magnetic power is generated in the front-curtain electromagnet 53 and the rear-curtain electromagnet 63 by supplying an electric power, and thereby the front-curtain 50 and the rear-curtain 60 can be in a standstill state regardless of the operations of the front-curtain drive lever 70 and rear-curtain drive lever 80. Accordingly, the rear-curtain drive lever 80 changes from an open state to a closed state, however the rear-curtain 60 actually remains in the open state. The front-curtain drive lever 70 changes from a closed state to an open state, however the front-curtain 50 actually remains in the closed state.

At positions 603a and 603b, the first roller 71 passes a region in which the first front-curtain gear segment 24 is not formed. Accordingly, the front-curtain drive lever 70 can return to its original state, i.e., the open state. At positions 603a to 603c, the rear-curtain 60 is supported so as to have a mechanically open state, because the second roller 81 is located on the rear-curtain gear line 23. A timing of an electric power supply provided to the rear-curtain electromagnet 63 is set in section 603, however the timing of an electric power supply may be similar to that of the front-curtain electromagnet 53 for convenience in a drive control.

Position 603d indicates an initial location of the second roller 81 at which the rear-curtain gear line 23 is not formed. If the second roller 81 passes the region in which the rear-curtain gear line 23 is not formed, then the rear-curtain drive lever 80 is disposed in a closed state. At position 603d, the front-curtain drive lever 70 passes a region in which the rear-curtain gear line 23 is formed but the front-curtain gear line 25 is not formed, and thereby a rolling operation of the first roller 71 is not performed. Such an operation can be provided by disposing the rear-curtain gear line 23 at a lower side and disposing the front-curtain gear line 25 at an upper side so that the first roller 71 and the second roller 81 pass spaces that are different from each other, as already described in the structure of the cam gear 20.

In section 605, a movement of a slit gap is performed by removing magnetic power provided to the front-curtain electromagnet 53 and the rear-curtain electromagnet 63 according to a time interval, and a photo image is captured by collecting incident light that is projected onto the sensor array 140 through the slit gap. The captured photo image may be provided to the display unit 120 or automatically saved according to a camera setting. In section 605, the second roller 81 of the rear-curtain drive lever 80 and the first roller 71 of the front-curtain drive lever 70 are located in a region in which rolling operations are not performed, as shown at position 605a.

In section 607, after passing section 605, the motor 10 continues to rotate the cam gear 20 while the front-curtain 50 and the rear-curtain 60 respectively change from a closed state to an open state and from an open state to a closed state. The magnetic power provided by the rear-curtain electromagnet 63 and the front-curtain electromagnet 53 may be removed by shutting off electric power supplies.

At position 607a, the first roller 71 of the front-curtain drive lever 70 passes the second front-curtain gear segment 26, which is formed at the upper side of the rear-curtain gear line 23, according to the rotation of the cam gear 20, and thereby the front-curtain 50 changes from an open state to a closed state according to the rotation of the first roller 71. At position 607b, if the second roller 81 of the rear-curtain drive lever 80 reaches a region of the cam gear 20 in which the rear-curtain gear line 23 is formed after passing the region of the cam gear 20 in which the rear-curtain gear line 23 is not formed, then the second roller 81 of the rear-curtain drive lever 80 performs a rolling operation, and thereby the rear-curtain 60 changes from a closed state to an open state. At position 607c, if the first roller 71 of the front-curtain drive lever 70 reaches the end of the region in which the first front-curtain gear segment 24 is formed, then the first roller 71 of the front-curtain drive lever 70 stops the rolling operation, and thereby the front-curtain drive lever 70 is located in its original position. The front-curtain 50 may operate the opening part 30 so as to change from a closed state to an open state, as shown in position 607d, by using the first elastic member 75 because the front-curtain electromagnet 53 remains in a switched-off state. The rear-curtain drive lever 80 mechanically opens the rear-curtain 60. The cam gear 20 continues to be driven by the motor operation, and has a state shown at position 607e. The state of position 607e is the same as the initial state of Position 607a, and thereby the camera device 100, according to the present exemplary embodiment, performs photographing an image in a single shot mode when the cam gear 20 rotates for 1 revolution.

Figure 7:
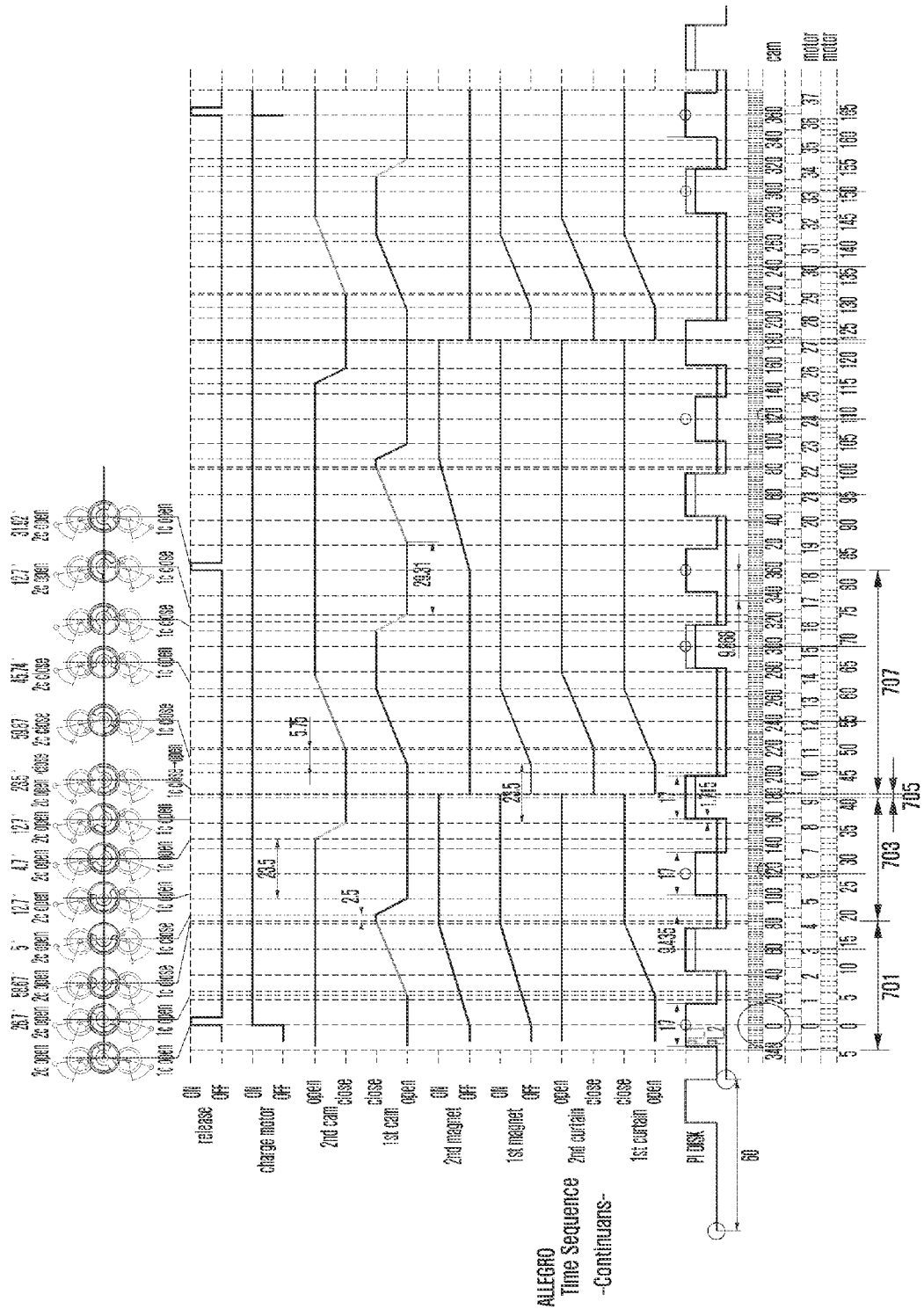
FIG. 7 is a graph showing a timing of a shutter driving system in a continuous shot mode according to an exemplary embodiment of the present invention.

FIG. 7 is a graph showing a timing of a shutter driving system in a continuous shot mode according to an exemplary embodiment of the present invention.

Referring to FIG. 7, a continuous shot operation of the shutter driving system 150, according to the present exemplary embodiment, is substantially the same as the single shot operation of the shutter driving system 150 excluding several sections. Namely, the shutter driving system 150 according to the present exemplary embodiment respectively operates in sections 701, 703, and 705 in a manner similar to that as in Sections 601, 603, and 605 described above. Therefore description of the corresponding operations is omitted here.

In Section 707, the first roller 71 performs a rolling operation by passing a second front-curtain gear segment 26, and thereby the front-curtain 50 closes the opening part 30. Differently from the single shot operation, the shutter driving system 150 according to the present exemplary embodiment controls to stop the front-curtain drive lever 70 by supplying an electric power to the front-curtain electromagnet 53. Namely, the front-curtain electromagnet 53 maintains the front-curtain 50, which closed the opening part 30, so as to not open. Such an operation is continued in a continuous shot mode until a subsequent shutter input signal is received.

As a result, the cam gear 20, the front-curtain drive lever 70, and the rear-curtain drive lever 80 operate in the same way as in the single shot operation, however, in section 707, the front-curtain 50 maintains the closed state of the opening part 30 according to an electric supply provided to the front-curtain electromagnet 53 until the next period comes.

Figure 8:
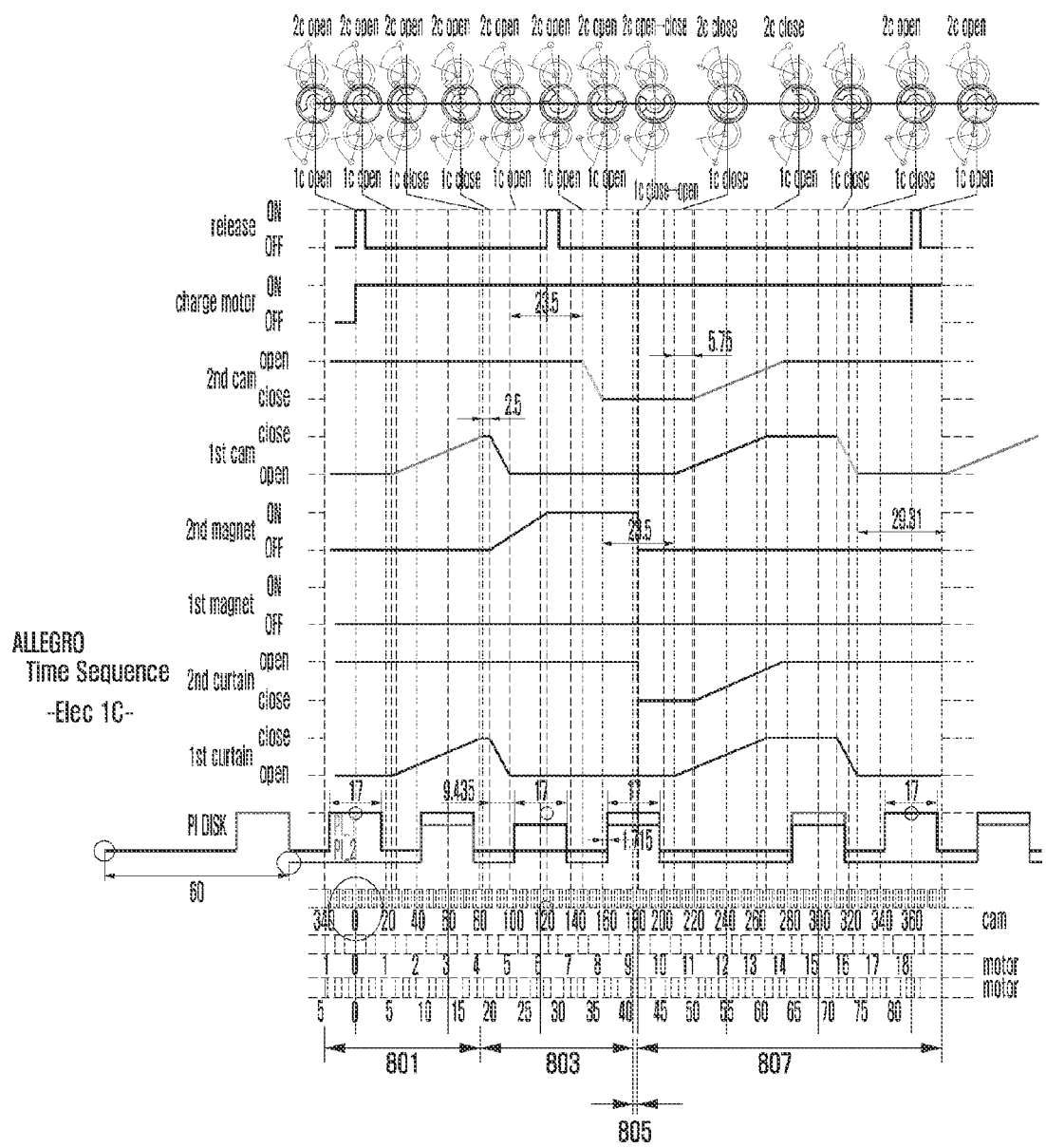
FIG. 8 is a graph showing a timing of a shutter driving system in an electronic front-curtain mode according to an exemplary embodiment of the present invention.

FIG. 8 is a graph showing a timing of a shutter driving system in an electronic front-curtain mode according to an exemplary embodiment of the present invention.

Referring to FIG. 8, an electronic front-curtain operation, according to the present exemplary embodiment, is performed by a shutter operation using only one of the front-curtain 50 and the rear-curtain 60. In the shutter driving system 150 according to the present exemplary embodiment, operations of the rear-curtain drive lever 80 and the front-curtain drive lever 70 for the electronic front-curtain operation are performed in the same manner as those of the rear-curtain drive lever 80 and the front-curtain drive lever 70 described with reference to FIG. 6, and therefore a detailed description of the corresponding operations is omitted herein below.

In the electronic front-curtain operation, the camera device 100 may maintain the front-curtain electromagnet 53 to be in a switched-off state without using the front-curtain electromagnet 53, and the front-curtain drive lever 70 moves along the front-curtain gear line 25. Opening and closing operations of the opening part 30 are identical to that of the front-curtain drive lever 70. Namely, in the electronic front-curtain operation according to the present exemplary embodiment, information corresponding to light projected onto the sensor array 140 may be read and captured as an image by controlling the closing time of the opening part 30 of the rear-curtain 60 without electronically operating the front-curtain 50.

For this, the timing of changing the rear-curtain 60 from an open state to a closed state is controlled by supplying an electric power to the rear-curtain electromagnet 63 only in the section in which the opening part 30 changes from an open state to a closed state. In particular, the rear-curtain electromagnet 63 may stop the rear-curtain 60 from maintaining the open state in section 803 in advance of section 805, in which light projected onto the sensor array 140 are read. Namely, in section 803, the rear-curtain 60 maintaining a mechanically open state due to the cam gear 20 changes to an open state due to the rear-curtain electromagnet 63.

In section 805, the magnetic power of the rear-curtain electromagnet 63 is removed by switching off the electric power, and thereby the stopped rear-curtain drive lever 80 closes the opening part 30 via the second elastic member 85. In this process, the image processor 130 reads light information of a boundary region formed by the rear-curtain 60 closing the opening part 30, and a photo image is generated by using the image projected onto the sensor array 140. Thereafter, in section 807, the rear-curtain drive lever 80 changes the rear-curtain 60 to an open state while passing the rear-curtain gear line 23.

As described above, the camera device 100, according to the present exemplary embodiments, performs various modes such as a single shot mode, continuous shot mode, and electronic front-curtain mode by using the cam gear 20 and the electromagnets 53 and 63, and provides easier and faster opening and closing operations of the shutter, and thereby enables development of an apparatus having a smaller size than a related art apparatus. Particularly, in the case of supporting an electronic front-curtain mode, a camera for image capturing may be designed excluding components related to the front-curtain such as a front-curtain 50, a front-curtain link 51, and front-curtain drive lever 70, and thereby an small camera, as compared to the related art, may be manufactured.

In the case of the camera device 100 supporting only the electronic front-curtain mode, the shutter driving system according to the present exemplary embodiments may be configured only with a base plate including an opening part, a curtain disposed at an edge of the base plate, a drive lever controlling opening and closing operations of the opening part, an electromagnet selectively stopping the drive lever, a cam gear mechanically closing the opening part by operating the drive lever, and a motor rotating the cam gear. Additionally, a reduction gear train for reducing the speed of the motor may be further included. Here, the cam gear may have only one gear line, for example, a rear-curtain gear line for driving the curtain.

In the shutter driving system having the above configuration, a camera driving method according to the present exemplary embodiments may basically support a preview mode through a control process of the curtain for mechanically opening the opening part by a mechanical operation of the drive lever based on the gear line formed in the cam gear. The camera driving method according to the present exemplary embodiments may provide an electronic front-curtain mode including steps of stopping the curtain previously stopped mechanically based on the guide line formed in the cam gear by using the electromagnet, controlling the curtain to close the opening part by removing a magnetic power of the electromagnet and capturing light projected onto a sensor array corresponding to a boundary line between the curtain and the opening part as a photo image, and mechanically opening the opening part of the curtain based on the guide line formed in the cam gear. Because the electronic front-curtain mode for photographing an image is practically supported by driving a rear-curtain, the electronic front-curtain mode may be referred to in a various forms, such as an electronic rear-curtain mode and a single curtain mode, according to a designer's intention or a worker's intention.

The camera device 100 described above may further include various additional modules according to its provision form. For example, the camera device 100 may include a component not described above, such as a short-range communication module, a Radio Frequency (RF) communication module, an interface for a wired or wireless data communication of the terminal, an internet communication module for communicating with the Internet and a network, a digital broadcasting module for receiving and replaying a digital broadcasting, a memory for storing user data generated by the camera device 100 and for storing instructions, an operating system and other similar and or suitable information used for operation of the camera device 100. The memory may be any suitable type of non-volatile computer readable storage medium, such as a Read-Only Memory (ROM), a Random Access Memory (RAM), optical memory device, magnetic memory devices, and any other similar and/or suitable non-volatile computer readable storage medium. Such components are changing very fast according to a convergence trend of digital equipment, and thereby all of them cannot be listed here. However, a component having an equal level to the aforementioned components may be further included in the camera device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A shutter driving system, the system comprising:
  a base plate including an opening part;
  a front-curtain and a rear-curtain, both the front-curtain and the rear-curtain being disposed at an edge of the base plate;
  a front-curtain link and a rear-curtain link supporting respective folding and unfolding operations of the front-curtain and the rear-curtain;
  a front-curtain drive lever and a rear-curtain drive lever controlling respective drives of the front-curtain link and the rear-curtain link for opening and closing the opening part by the front-curtain and the rear-curtain;
  a front-curtain electromagnet and a rear-curtain electromagnet selectively and respectively stopping the front-curtain drive lever and the rear-curtain drive lever;
  a cam gear including a rotatable gear body and an electromagnet position identifying structure formed at the gear body and mechanically closing the opening part of the front-curtain by operating the front-curtain drive lever and mechanically opening the opening part of the rear-curtain by operating the rear-curtain drive lever;
  a motor rotating the cam gear; and
  a reduction gear train including at least one gear disposed between the cam gear and the motor for reducing a rotation speed of the motor to a reduced rotation speed of the cam gear.

2. The system of claim 1, wherein the cam gear comprises:
  a rear-curtain gear line formed at a front surface of the gear body and having a partial circular band form for operating the rear-curtain drive lever;
  a front-curtain gear line formed at the upper side of the rear-curtain gear line for operating the front-curtain drive lever; and
  a fixing hole formed rotatively on the base plate.

3. The system of claim 2, wherein the front-curtain gear line comprises:
  a first front-curtain gear segment formed to have a predetermined length at a side of a first half of the rear-curtain gear line; and
  a second front-curtain gear segment formed to have a predetermined length at a side of a second half of the rear-curtain gear line.

4. The system of claim 3, wherein the front-curtain drive lever comprises:
  a first roller rotating the first front-curtain gear segment and the second front-curtain gear segment;
  a body rotating according to the first roller;
  a first elastic member compressing and increasing an elastic force according to the rotation of the first roller, and returning the position of the front-curtain drive lever if the elastic force is removed; and
  a first link connected to the body and driving the front-curtain link according to the rotation of the first roller.

5. The system of claim 2, wherein the rear-curtain drive lever comprises:
  a second link controlling the operation of the rear-curtain link for the control of folding and unfolding of the rear-curtain;
  a second roller rotating the rear-curtain gear line and mechanically opening the opening part of the rear-curtain;
  a second elastic member compressing and increasing an elastic force according to the rotation of the second roller, and returning the position of the rear-curtain drive lever if the elastic force is removed; and a rear-curtain drive lever body rotating according to the second roller.

6. The system of claim 2, wherein the electromagnet position identifying structure of the cam gear is formed at a rear side of the gear body facing the rear-curtain gear line and the front-curtain gear line, and sensing magnetic power states of the front-curtain electromagnet and the rear-curtain electromagnet.

7. A camera device, the device comprising:
a shutter driving system for controlling a shutter operation;
a sensor array capturing an image according to the operation of the shutter driving system; and
an image processor controlling the shutter driving system and capturing an image projected onto the sensor array,
wherein the shutter driving system comprises: a base plate including an opening part;
a front-curtain and a rear-curtain, both the front-curtain and the rear-curtain being disposed at an edge of the base plate;
a front-curtain link and a rear-curtain link supporting respective folding and unfolding operations of the front-curtain and the rear-curtain;
a front-curtain drive lever and a rear-curtain drive lever controlling respective drives of the front-curtain link and the rear-curtain link for opening and closing the opening part by the front-curtain and the rear-curtain;
a front-curtain electromagnet and a rear-curtain electromagnet selectively and respectively stopping the front-curtain drive lever and the rear-curtain drive lever;
a cam gear including a rotatable gear body and an electromagnet position identifying structure formed at the gear body and mechanically closing the opening part of the front curtain by operating the front-curtain drive lever and mechanically opening the opening part of the rear-curtain by operating the rear-curtain drive lever;
a motor rotating the cam gear; and
a reduction gear train including at least one gear disposed between the cam gear and the motor for reducing a rotation speed of the motor to a reduced rotation speed of the cam gear.

8. The device of claim 7, wherein the cam gear comprises:
a rear-curtain gear line formed at a front surface of the gear body and having a partial circular band form for operating the rear-curtain drive lever;
a front-curtain gear line formed at the upper side of the rear-curtain gear line for operating the front-curtain drive lever; and
a fixing hole formed rotatively on the base plate.

9. The device of claim 8, wherein the front-curtain gear line comprises:
a first front-curtain gear segment formed to have a predetermined length at a side of the first half of the rear-curtain gear line; and
a second front-curtain gear segment formed to have a predetermined length at a side of the second half of the rear-curtain gear line.

10. The device of claim 9, wherein the front-curtain drive lever comprises:
a first roller rotating the first front-curtain gear segment and the second front-curtain gear segment;
a body rotating according to the first roller;
a first elastic member compressing and increasing an elastic force according to the rotation of the first roller, and returning the position of the front-curtain drive lever if the elastic force is removed; and a first link connected to the body and driving the front-curtain link according to the rotation of the first roller.

11. The device of claim 8, wherein the rear-curtain drive lever comprises:
a second link controlling the operation of the rear-curtain link for the control of folding and unfolding of the rear-curtain;
a second roller rotating the rear-curtain gear line and mechanically opening the opening part of the rear-curtain;
a second elastic member compressing and increasing an elastic force according to the rotation of the second roller, and returning the position of the rear-curtain drive lever if the elastic force is removed; and
a rear-curtain drive lever body rotating according to the second roller.

12. The device of claim 8, wherein the electromagnet position identifying structure of the cam gear is formed at a rear side of the gear body facing the rear-curtain gear line and the front-curtain gear line, and sensing magnetic power states of the front-curtain electromagnet and the rear-curtain electromagnet.

13. The device of claim 7, wherein the rear-curtain electromagnet and the front-curtain electromagnet form a slit gap between the front-curtain opening the opening part from a closed state by releasing a magnet power within a predetermined time difference according to the control of the image processor and the rear-curtain closing the opening part from an open state.

14. The device of claim 13, wherein the image processor controls to capture an image projected onto the sensor array as a photo image according to the movement of the formed slit gap.

15. The device of claim 7, wherein the rear-curtain maintains a state of being mechanically open by the cam gear in a preview mode.

16. A method of driving a camera for performing a preview mode, the method comprising:
preparing a camera having a shutter driving system provided with a base plate including an opening part, a front-curtain and a rear-curtain, both the front-curtain and the rear-curtain being disposed at an edge of the base plate, a front-curtain drive lever and a rear-curtain drive lever controlling opening and closing of the opening part respectively of the front-curtain and the rear-curtain, a front-curtain electromagnet and a rear-curtain electromagnet selectively and respectively stopping the front-curtain drive lever and the rear-curtain drive lever, a cam gear mechanically closing the opening part of the front-curtain by operating the front-curtain drive lever and mechanically opening the opening part of the rear-curtain by operating the rear-curtain drive lever, and a motor for rotating the cam gear;
controlling the rear-curtain to mechanically open the opening part by operating the rear-curtain drive lever based on a rear-curtain gear line of the cam gear;
controlling the front-curtain to maintain an open state of the opening part without operating the front-curtain drive lever; and
performing a single mode or an continuous mode, the performing of the single mode or the continuous mode further comprising:
preparing an exposure start period in which the rear-curtain is controlled so as to open the opening part by controlling the rear-curtain electromagnet in order to stop the rear-curtain drive lever, in which the front-curtain is controlled to mechanically close the opening part by controlling the front-curtain drive lever to mechanically operate based on the front-curtain gear line formed in the cam gear, and in which the opening part stops a closed state by supplying an electric power to the front-curtain electromagnet;

exposing and capturing an image, wherein releasing magnetic powers of the rear-curtain electromagnet and the front-curtain electromagnet is controlled during a predetermined time difference in order to form a slit gap according to a camera setting and, wherein a photo image is prepared by collecting incident light projected onto a sensor array through the slit gap while forming the slit gap and processing the collected incident light; and closing the opening part, wherein the rear curtain is controlled so as to mechanically open the opening part by operating the rear-curtain drive lever based on a rear-curtain gear line formed in the cam gear and, wherein the front-curtain opening of the opening part is controlled so as to mechanically close the opening part by operating the front-curtain drive lever based on the front-curtain gear line formed in the cam gear.

17. The method of claim 16, wherein the performing of the single mode further comprises:

opening the opening part, wherein the front-curtain is controlled so as to open the opening part by returning the position of the front-curtain driver lever to its original position if the front-curtain driver lever reaches a cam gear region where the front-curtain gear line is not formed while the rear-curtain is maintaining the opening part to be mechanically open based on the rear-curtain gear line of the cam gear.

18. The method of claim 16, wherein the performing of the continuous mode further comprises:

preparing another exposure start period in which the rear-curtain is controlled so as to mechanically open the opening part by using the rear-curtain electromagnet and in which a magnetic power is formed in the front-curtain electromagnet so that the front-curtain maintains opening part in a closed state; and repeating the exposing and the capturing of the image, the closing of the opening part, and a reinitializing of the exposure, according to an input signal of a set continuous shot.

19. A method of driving a camera for performing a preview mode, the method comprising:

preparing a camera having a shutter driving system provided with a base plate including an opening part, a curtain disposed at an edge of the base plate, a drive lever controlling opening and closing of the opening part of the curtain, an electromagnet selectively stopping the drive lever, a cam gear mechanically closing the opening part of the curtain by operating the drive lever, and a motor rotating the cam gear;

controlling the curtain to mechanically open the opening part by operating the drive lever based on a gear line formed in the cam gear; and performing a single mode or a continuous mode, the performing of the single mode or the continuous mode further comprising:

preparing an exposure start period in which the curtain is controlled so as to open the opening part by controlling the electromagnet in order to stop the drive lever, in which the curtain is controlled to mechanically close the opening part by controlling the drive lever to mechanically operate based on the gear line formed in the cam gear, and in which the opening part stops a closed state by supplying an electric power to the electromagnet;

exposing and capturing an image, wherein releasing magnetic powers of the electromagnet and the electromagnet is controlled during a predetermined time difference in order to form a slit gap according to a camera setting and, wherein a photo image is prepared by collecting incident light projected onto a sensor array through the slit gap while forming the slit gap and processing the collected incident light; and closing the opening part, wherein the curtain is controlled so as to mechanically open the opening part by operating the drive lever based on a gear line formed in the cam gear and, wherein the curtain opening of the opening part is controlled so as to mechanically close the opening part by operating the drive lever based on the gear line formed in the cam gear.

20. The method of claim 19, further comprising:

performing an electronic front-curtain mode, the performing of the electronic front-curtain mode further comprising:

controlling the curtain to be mechanically stopped based on the gear line formed in the cam gear by using the electromagnet;

capturing an image projected onto a sensor array facing a boundary line of the curtain and the opening part as a photo image by controlling the curtain to close the opening part based on releasing a magnetic power of the electromagnet; and mechanically opening the opening part of the curtain based on a gear line formed in the cam gear.

* * * * *